United States Patent
Axtell, III et al.

(10) Patent No.: US 10,577,279 B2
(45) Date of Patent: Mar. 3, 2020

(54) GRAIN BOUNDARY HEALING GLASSES AND THEIR USE IN TRANSPARENT ENAMELS, TRANSPARENT COLORED ENAMELS AND OPAQUE ENAMELS

(71) Applicant: Ferro Corporation, Mayfield Heights, OH (US)

(72) Inventors: Enos A. Axtell, III, Seven Hills, OH (US); John J. Maloney, Solon, OH (US); James D. Walker, Chagrin Falls, OH (US); Srinivasan Sridharan, Strongsville, OH (US); George E. Sakoske, Independence, OH (US)

(73) Assignee: Ferro Corporation, Mayfield Heights, OH (US)

( * ) Notice: Subject to any disclaimer, the term of this patent is extended or adjusted under 35 U.S.C. 154(b) by 76 days.

(21) Appl. No.: 15/544,061

(22) PCT Filed: Jan. 4, 2016

(86) PCT No.: PCT/US2016/012027
§ 371 (c)(1),
(2) Date: Jul. 17, 2017

(87) PCT Pub. No.: WO2016/122833
PCT Pub. Date: Aug. 4, 2016

(65) Prior Publication Data
US 2018/0009700 A1    Jan. 11, 2018

Related U.S. Application Data

(60) Provisional application No. 62/107,680, filed on Jan. 26, 2015.

(51) Int. Cl.
| | | |
|---|---|---|
| C03C 8/04 | (2006.01) |
| C03C 8/16 | (2006.01) |
| C03C 17/04 | (2006.01) |
| C03C 8/02 | (2006.01) |
| C03C 8/06 | (2006.01) |
| C03C 8/08 | (2006.01) |
| C03C 8/10 | (2006.01) |
| C03C 8/12 | (2006.01) |
| C03C 8/14 | (2006.01) |

(52) U.S. Cl.
CPC ............... *C03C 8/16* (2013.01); *C03C 8/02* (2013.01); *C03C 8/04* (2013.01); *C03C 8/06* (2013.01); *C03C 8/08* (2013.01); *C03C 8/10* (2013.01); *C03C 8/12* (2013.01); *C03C 8/14* (2013.01); *C03C 17/04* (2013.01); *C03C 2204/04* (2013.01); *C03C 2207/00* (2013.01)

(58) Field of Classification Search
CPC .. C03C 8/24; C03C 8/04; C03C 3/066; C03C 3/145; C03C 3/155
See application file for complete search history.

(56) References Cited

U.S. PATENT DOCUMENTS

| | | | |
|---|---|---|---|
| 2,946,704 A * | 7/1960 | Smalley | C03C 4/00 427/376.4 |
| 5,443,669 A * | 8/1995 | Tunker | B32B 17/10036 156/102 |
| 5,783,507 A | 7/1998 | Sakoske | |
| 5,900,319 A | 5/1999 | Sakoske | |
| 5,925,160 A | 7/1999 | Sakoske | |
| 5,968,659 A | 10/1999 | Sakoske et al. | |
| 6,022,624 A | 2/2000 | Sakoske | |
| 6,105,394 A | 8/2000 | Sridharan et al. | |
| 6,207,285 B1 | 3/2001 | Sakoske et al. | |
| 6,255,239 B1 | 7/2001 | Sakoske | |
| 6,346,493 B1 | 2/2002 | Kniajer et al. | |
| 6,624,104 B2 | 9/2003 | Sakoske et al. | |
| 6,936,556 B2 | 8/2005 | Sridharan et al. | |
| 7,462,304 B2 * | 12/2008 | Wang | C03C 3/064 252/514 |
| 7,955,470 B2 | 6/2011 | Kapp et al. | |
| 8,043,721 B2 | 10/2011 | Khadilkar et al. | |
| 8,092,911 B2 | 1/2012 | Sakoske et al. | |
| 8,202,812 B2 | 6/2012 | Sakoske | |
| 8,772,189 B2 | 7/2014 | Singh et al. | |
| 9,315,413 B2 | 4/2016 | Singh et al. | |

(Continued)

FOREIGN PATENT DOCUMENTS

SU        1671627 A1    8/1991

OTHER PUBLICATIONS

International Search Report for corresponding PCT/US2016/012027 dated May 19, 2016, one page.

*Primary Examiner* — Noah S Wiese
(74) *Attorney, Agent, or Firm* — Rankin, Hill & Clark LLP

(57) ABSTRACT

A method of modifying glass frit involves treating the frit with a grain-boundary-healing compound. The method increases transmission and clarity, and reduces haze of a fired enamel coating made from such modified glass frit as compared to a coating not made from such modified glass frit. The grain-boundary-healing compound influences the chemistry at the grain boundaries to prevent haze. The compound burns out to yield a fluxing material that dissolves alkaline carbonates or bicarbonates on the surface of the glass frit. The dissolved species are incorporated into the enamel coating, thereby promoting the fusion of the glass frit and reducing the amount of haze in the enamel coating. The additives also function to prevent the formation of seed crystals on the surface of the glass frit that may inhibit the fusion of the glass frit.

10 Claims, No Drawings

(56) References Cited

U.S. PATENT DOCUMENTS

| | | |
|---|---|---|
| 9,637,409 B2 | 5/2017 | Singh et al. |
| 9,671,529 B2 | 6/2017 | Sakoske et al. |
| 9,688,566 B2 | 6/2017 | Darbouret et al. |
| 9,758,427 B2 | 9/2017 | Axtell, III et al. |
| 2009/0056798 A1* | 3/2009 | Merchant ................ H01B 1/16 136/256 |
| 2012/0178207 A1* | 7/2012 | Jiang ............... H01L 31/022425 438/98 |

* cited by examiner

GRAIN BOUNDARY HEALING GLASSES AND THEIR USE IN TRANSPARENT ENAMELS, TRANSPARENT COLORED ENAMELS AND OPAQUE ENAMELS

FIELD

The present subject matter relates to the use of additives in low-melting glasses or glass enamel pastes to improve the transparency, dielectric properties, and/or color development of the fired glass enamel.

BACKGROUND

Enamels have been used extensively for the decoration of glass. Many of these decorations include bright opaque colors, such as the decorations on soda bottles, or include the black band printed on the edges of automobile windshields. Some of the decorations are translucent, such as the imitation acid-etch coating seen on various liquor bottles.

A general drawback to the use of enamel layers made from glass frit paste is that it is presently difficult to obtain optically transparent enamel glass coatings. Instead, the enamels have a certain degree of haze that forms in the enamel coating during firing.

Ordinarily, glass frit (which will also be referred to herein as particles or grains) is produced by adding and mixing together various oxides or other glass raw material components, and heating the mixture to smelting temperatures to form a molten glass batch. The resulting glass batch is quenched rapidly through the glass transition temperature of the glass batch to produce an amorphous solid. Cooling is conducted by means such as roll quenching or water quenching. After cooling, the amorphous solid is milled to form glass frit of a particular size suitable for use in glass enamels. Milling is also referred to herein as "grinding" or "fritting." The amorphous solid could be milled in water, in a solvent, or by a dry method such as air milling or jet milling. The wet frit is dried by heating to remove the water content. The resulting dry glass frit diffracts light to a high degree due to the many exhibited surfaces of the frit particles.

When used to form enamel coatings, the frit can be mixed with an organic carrier (e.g., an organic binder and solvent) to form an enamel paste. The paste is then applied on a substrate, dried to remove any solvent or liquid in the paste, and fired to burn off the organic binder and to fuse the frit particles/grains. The molten enamel is then cooled to form a substantially continuous enamel coating on the substrate.

Ordinarily, firing of an enamel paste on a substrate causes the glass frit particles in the paste to fuse together. As the glass frit particles are fused together by heating, the number of exhibited frit surfaces decreases. That is, the surfaces of adjacent frit particles do not remain distinct from one particle to the next, but rather the frit particles melt or fuse together to form a substantially continuous coating of softened enamel, which is then cooled to form a hardened glass enamel coating on the surface of the substrate.

In other words, as the frit particles are subsumed into each other during firing, many surfaces of the individual frit particles are no longer apparent because the frit particles at least partially fused into a single mass of softened glass enamel. This can be likened to melting ice cubes. The surfaces of the ice cubes disappear as the cubes melt to form a pool of water. If the ice cubes are not completely melted however, then the surfaces of the cubes or portions thereof, will still be present and will still refract light. Likewise, if all frit particles in an enamel paste are not completely fused together, then the surfaces of the particles that remain unfused after firing will still diffract light to a certain extent. The diffraction of light at the frit surfaces contributes to the amount of haze in the enamel coating.

The processing steps used to make glass frit and fired enamel coatings may impact the surface chemistry of the glass frit particles, which can inhibit the fusion of glass frit particles. The unfused surfaces of the frit particles will be referred to herein as "grain boundaries." The grain boundaries produce haze in the resulting enamel coating by diffracting light. While not being bound to any particular theory, it is believed that these processing steps result in chemically bound water being introduced into the glass frit, carbonates and bicarbonates being deposited on the surface of the glass frit particles, and/or seed crystals forming in the glass frit. These contaminants lead to an increase in the amount of grain boundaries present in a fired enamel coating and a corresponding increase the amount of haze as described below.

It is believed that the processing steps used to make glass frit and enamel coatings may lead to atmospheric water being absorbed by the glass frit during storage, wherein the frit is often stored under atmospheric conditions before being mixed with an organic carrier to form an enamel paste. Upon firing, the chemically bound water in the glass frit tries to escape from the enamel bulk in the form of water vapor. This gas may not fully escape the enamel bulk during processing and when the enamel is cooled, the gas may become trapped in the enamel coating in the form of bubbles. The trapped bubbles diffract light and cause haze in the enamel coating.

The processing steps used to produce frit and enamel coatings may also lead to alkali, alkaline earth, and boron species leaching to the surface of the frit particles. More specifically, low melting glasses may have relatively large amounts of alkali metals (Li, Na, K, Rb, Cs), alkaline earth metals (Mg, Ca, Sr, Ba) and boron (B), which may leach to the surface of the frit particles as a result of the grinding process. Because some grinding processes use water as a medium for grinding, the water partially dissolves these alkali, alkaline earth, and boron species to thereby form the associated hydroxides of these species. After milling, the frit is dried to remove the water content and these dissolved hydroxide species precipitate on the surface of the glass frit particles. When these precipitated hydroxide species are exposed to regular atmospheric conditions during storage, the precipitated hydroxide species can react with carbon dioxide in the atmosphere to form carbonates and bicarbonates on the surface of the frit particles.

It is believed that carbonate and bicarbonate species inhibit fusion of the glass frit particles. That is, carbonates and bicarbonates are situated on the surface of the frit particles and stand between frit particles during firing, thereby disrupting the fusion of the particles. As such, some of the frit particles, or portions thereof, are prevented from completely fusing together. The grain boundaries that are present as a result of unfused frit will refract light and thereby contribute to haze in the enamel coating.

Furthermore, the presence of carbonate and bicarbonates on the surface of the glass frit particles could lead to the production of $CO_2$ gas in the bulk of the molten enamel. $CO_2$ gas could form from the decomposition of carbonates and bicarbonates during the firing process, causing the formation of carbon inclusions or gas bubbling in the molten glass enamel. These bubbles may be trapped in the cooled enamel coating upon cooling, which would further contribute to unwanted haze.

The processing steps used to produce frit and enamel coatings may also lead to the production of seed crystals in the glass frit. More specifically, as a result of the leaching of alkaline and alkaline earth species from the glass frit during grinding, higher amounts of the network former oxides and network intermediate oxides remain in the glass frit particles. Such higher amounts of these elements may yield seed crystal compositions of $Zn_2SiO_4$ or $Bi_4Si_3O_{12}$, depending upon the glass composition. The seed crystals can act as nucleation sites for the growth of larger crystals during firing of the glass enamel. The seed crystals or larger nucleated crystals can inhibit fusion of the glass frit particles. Like carbonates and bicarbonates, the seed crystals stand between frit particles during firing and prevent the frit particles from completely fusing together. This results in light diffracting grain boundaries in the fired enamel coating that cause haze. Furthermore, the seed crystals and larger nucleated crystals can themselves diffract light and thereby increase haze in the fired enamel coating.

Because of the gas, carbonates and bicarbonates, and seed crystals present in the enamel pastes, some of the frit particles, or portions thereof, remain distinct and separate from adjacent frit particles even after firing. Therefore, the surfaces of the unfused frit particles, i.e. grain boundaries, diffract light and create haze in the fired enamel coating.

The amount of haze in the fired enamel coating is commensurate with the size or number of grain boundaries present in the fired enamel coating. In this way, it can be generally summarized that reduced fusing of frit particles results in more grain boundaries being present in the fired enamel coating, which results in more haze in the coating.

SUMMARY

It is the object of the present subject matter to make use of various compounds to improve the transparency of fired glass-frit-based coatings by promoting more complete fusion of the glass grains and by reducing the amount or size of grain boundaries present in the fired enamel coating.

Increased fusion of glass grains and the reduction of grain boundaries between the frit particles in a fired enamel coating will be referred to herein as "healing" of the grain boundaries between the frit particles. Such healing of grain boundaries is accomplished by removing carbonates and bicarbonates species and seed crystals on the surface of the glass frit particles. Healing of the grain boundaries may also result from improved flow of the softened or molten glass enamel due to a reduction in viscosity of the softened or molten glass enamel. This improved flow allows gas produced during the firing process to more readily escape from the bulk of the softened or molten enamel so the gas is not trapped in the enamel coating upon cooling. The resulting reduction of bubbles trapped in the cooled glass enamel produces a reduction in haze. A reduction of bubbling and healing of the boundaries also improves the dielectric properties of transparent enamels and the color development of opaque enamels.

Compounds that improve the transparency of fired glass-frit-based coatings by promoting more complete fusion of the glass grains and by reducing the amount or size of boundaries present in the first enamel coating will be referred to herein as "grain-boundary-healing" compounds/additives.

In one aspect, a method of preparing glass frit is provided. The method includes smelting raw material to produce a glass batch. The glass batch is quenched to produce an amorphous solid. The amorphous solid is milled to produce glass frit. The method includes mixing a grain-boundary-healing additive with the glass frit.

In another aspect, a method of preparing a glass enamel paste is provided. The method comprises providing glass frit. The glass frit is mixed with a grain-boundary-healing additive to produce a treated glass frit. The treated glass frit is combined with an organic carrier to thereby prepare an enamel paste.

In another aspect, a method of preparing glass enamel on a substrate is provided. The method includes providing an enamel paste including a treated glass frit and an organic carrier. The treated glass frit includes a grain-boundary-healing additive on surfaces of the treated glass frit. The method includes applying the enamel paste to a substrate and firing the enamel paste to fuse the glass frit and burn out the organic carrier to thereby prepare glass enamel on the substrate.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides methods for increasing the transparency, clarity, and dielectric properties of glass enamels, while reducing the haze of glass enamels. In accordance with the present subject matter, a grain-boundary-healing additive is added to a glass frit to reduce the amount of haze in a fired enamel coating.

In one embodiment, a grain-boundary-healing additive includes a metal species, and the grain-boundary-healing additive will burn out/decompose to give a material that acts as a "fluxing" or "mineralizing" material. The decomposed grain-boundary-healing additive acts as a fluxing or mineralizing material by acting as a high temperature solvent that dissolves alkali and alkaline earth impurities into solution and thereby should reduce the amount of these impurities present on the surface of the frit particles. When the amount of impurities is reduced, the frit particles can more completely fuse together and the number of grain boundaries is reduced compared to a situation where a grain-boundary-healing additive is not used. Further, the resulting solution (comprising impurities dissolved in the grain-boundary-healing additive) is soluble in the molten glass and therefore can dissolve into the softened or molten coating during firing.

The present subject matter includes incorporating a grain-boundary-healing component in a glass enamel paste either by adding the component during fritting of the amorphous solid, or by adding the component to the frit or frit paste after fritting.

In either event, the grain-boundary-healing component in the glass enamel paste increases in transparency and clarity and a decreases haze of a fired enamel coating compared to an enamel coating formed from an enamel paste that does not contain the grain-boundary-healing additive. The resulting enamel also possesses improved dielectric properties.

Grain-Boundary-Healing Additives

In accordance with the present subject matter, a grain-boundary-healing additive operates to heal the grain boundaries by causing carbonates or bicarbonates present on the surface of the frit particles to decompose and/or by attacking and dissolving seed crystals that could act as nucleation sites for the growth of larger crystals on the surface of the frit grains. The grain-boundary-healing additives may further operate to heal the grain boundaries by preventing the formation of bubbles during firing, or by decreasing the viscosity of the molten enamel and allowing for their easy escape from the bulk of the molten enamel coating.

Organometallic Grain-Boundary-Healing Additives.

In accordance with the present subject matter, a grain-boundary healing additive includes an organometallic compound. Organometallic compounds are compounds that contain a metal-carbon bond. The metal atom can be an alkali metal, alkaline earth metal, a lanthanide, an actinides, transition metal, post-transition metal, or metalloid.

In one aspect, compounds useful as grain-boundary-healing additives include organometallic compounds containing at least one of Li, Na, K, Ba, V, Mn, Mo, W, Zn, In, Ga, Al, B, Si, P, Fe, Ta, Sb, Bi, Sn, Ge, Te, Y and As. While phosphorous is sometimes considered to be a non-metal, there is no standard definition of what constitutes a non-metal and phosphorous nevertheless displays characteristics between a metal and a non-metal. Since there is no standard definition of what constitutes a non-metal, phosphorous is sometimes considered to be a metalloid and is therefore included in the above listing of compounds to be used as the organometallic grain-boundary-healing additive.

The use of compounds containing V, Fe and Mn may color the enamel coating (yellow in the case of V, reddish brown in the case of Fe, and brown in the case of Mn). This coloring is of course valuable in some embodiments where color is desired, but may be undesirable in other applications where a non-colored enamel coating is desired. Additionally, compounds of V and As may not be desired due to their environmental toxicity.

Therefore, in another embodiment where a colorless coating is desired and environmental impact is a consideration, the grain-boundary-healing additives include compounds containing Li, Na, K, Ba, Mo, W, Zn, In, Ga, Al, B, Si, P, Ta, Sb, Bi, Sn, Ge, Te, and Y.

In several embodiments, the organometallic compounds are soluble in solvents used in the processing methods described herein to produce transparent enamels. Examples of suitable compounds expected to be soluble in alcohols, glycols, glycol ethers and the like, for use as grain-boundary-healing additives, are molybdenum (V) ethoxide [$Mo_2(OCH_2CH_3)_{10}$], molybdenyl triethoxide [$MoO(OCH_2CH_3)_3$], Molybdenyl acetylacetonate, Tungsten(V) Ethoxide [$W(OCH_2CH_3)_5$], Tungsten(VI) Ethoxide [$W(OCH_2CH_3)_6$], Tungsten(VI) Isopropoxide [$W(OCH(CH_3)_2)_6$], trimethylene borate, triethyl borate, triisopropyl borate, trimethyl borate, niobium(V) ethoxide [$Nb(OCH_2CH_3)_5$], niobium(V) isopropoxide [$Nb(OCH(CH_3)_2)_5$], niobium(V) n-propoxide [$Nb(O(CH_2)_2CH_3)_5$], niobium(V) n-butoxide (Nb(O(CH_2)_3CH_3)_5], niobium(V) n-pentyloxide [$Nb(O(CH_2)_4CH_3)_5$], tantalum(V) methoxide [$Ta(OCH_3)_5$], tantalum(V) ethoxide [$Ta(OCH_2CH_3)_5$], tantalum(V) isopropoxide [$Ta(OCH(CH_3)_2)_5$], antimony(III) methoxide [$Sb(OCH_3)_3$], antimony(III) ethoxide [$Sb(OCH_2CH_3)_3$], antimony(III) isopropoxide [$Sb(OCH(CH_3)_2)_3$], bismuth (III) tert-pentyloxide [$Bi(OCH_2C(CH_3)_3)_3$], tin(II) oxalate, tin(IV) methoxide [$Sn(OCH_3)_4$], tin(IV) ethoxide [$Sn(OCH_2CH_3)_4$], tin(IV) isopropoxide [$Sn(OCH(CH_3)_2)_4$], tin (IV) tert-butoxide [$Sn(OC(CH_3)_3)_4$], germanium(IV) methoxide [$Ge(OCH_3)_4$], germanium(IV) ethoxide [$Ge(OCH_2CH_3)_4$], germanium(IV) isopropoxide [$Ge(OCH(CH_3)_2)_4$], germanium(IV) n-butoxide [$Ge(O(CH_2)_3CH_3)_4$], tellurium(IV) ethoxide [$Te(OCH_2CH_3)_4$], barium ethoxide [$Ba(OCH_2CH_3)_2$], barium isopropoxide [$Ba(OCH(CH_3)_2)_2$], indium(III) ethoxide [$In(OCH_2CH_3)_3$], indium (III) isopropoxide [$In(OCH(CH_3)_2)_3$], gallium(III) ethoxide [$Ga(OCH_2CH_3)_3$], gallium(III) isopropoxide [$Ga(OCH(CH_3)_2)_3$], aluminum(III) ethoxide [$Al(OCH_2CH_3)_3$], aluminum(III) isopropoxide [$Al(OCH(CH_3)_2)_3$], aluminum(III) n-butoxide [$Al(O(CH_2)_3CH_3)_3$], aluminum(III) sec-butoxide [$Al(OCH(CH_3)CH_2CH_3)_3$], aluminum(III) tert-butoxide [$Al(OC(CH_3)_3)_3$], yttrium(III) isopropoxide [$Y(OCH(CH_3)_2)_3$], zinc(II) methoxyethoxide [$Zn(OCH_2CH_2OCH_3)_2$], silicon(IV) ethoxide [$Si(OCH_2CH_3)_4$] and silicon (IV) isopropoxide [$Si(OCH(CH_3)_2)_3$]. Other useful metal alkoxides are those based on 2,4 propanedioate and methoxyethoxide in combination with the metals above.

Phosphorus compounds soluble in alcohols, glycols, glycol ethers and the like include 2-phosphonopropionic acid, 3-phosphonopropionic acid, diethyl 2,2-diethoxyethyl phosphonate, diethyl hydroxymethylphosphonate, diisopropyl methylphosphonate, diethyl 2,2-dimethoxyethylphosphonate, ethylphosphonic acid, methylphosphonic acid, methylenediphosphonic acid and 1,2 ethylenediphosphonic acid. Many other organometallic compounds known to those skilled in the art, may be soluble in polar solvents. The use of these would not depart from the spirit of the invention.

In nonpolar solvents, metal preparations based on sulfurated turpentine are useful as precursor materials. Other compounds based on 2-ethylhexanoate salts of metals may be soluble in non-polar solvents. Many other classes of organometallic compounds known to those skilled in the art may be soluble in non-polar solvents and useful for producing grain-boundary-healing additives.

Inorganic Grain-Boundary-Healing Additives.

In another embodiment, the grain-boundary-healing additive includes an inorganic compound. In one aspect, the grain-boundary-healing additive includes an inorganic acid (i.e. mineral acid) and/or its corresponding salt. An inorganic acid is an acid derived from one or more inorganic compounds. These materials can be used for instance, by dissolving the inorganic acid in water and adding the solution to the mill during particle size reduction of the glass frit.

Examples of such inorganic acids and their corresponding salts suitable for use as grain-boundary-healing additives are boric acid ($H_3BO_3$), phosphoric acid ($H_3PO_4$), telluric acid ($Te(OH)_6$), hexafluoro-silicic acid ($H_2SiF_6$), hexafluoro-phosphoric acid ($HPF_6$), tetrafluoroboric acid ($HBF_4$), hexafluoroantimonic acid ($HSbF_6$), dihydrogen hexafluorozirconate ($H_2ZrF_6$), molybdic acid ($H_2MoO_4$), nitric acid ($HNO_3$), tungstic acid ($H_2WO_4$), borax ($Na_2B_4O_7$), mono-ammonium phosphate ($NH_4H_2PO_4$), mono-sodium phosphate ($NaH_2PO_4$), tri-sodium phosphate (TSP, $Na_3PO_4$), sodium nitrate ($NaNO_3$), potassium nitrate (KNOB), sodium hexa-fluorosilicate ($Na_2SiF_6$), potassium hexa-fluorosilicate ($K_2SiF_6$), sodium hexafluorosilicate ($Na_2SiF_6$), and sodium hexa-fluorophosphate ($NaPF_6$).

In another aspect, the grain-boundary-healing additive includes other inorganic materials such as sulfates, for example $Na_2SO_4$ and $BaSO_4$, and halides, for example NaCl, KBr and $MgCl_2$. Many other inorganic acids, salts and eutectic mixtures could be conceived of by those skilled in the art without departing from the spirit of the present subject matter.

These inorganic grain-boundary-healing additives work at least in part, by partially dissolving higher melting point oxides, which may be present in the glass frit and which would inhibit the fusion of glass frit particles if not dissolved. This dissolving action allows the frit grains to fuse together more easily in the enamel coating during firing.

In one embodiment, the grain-boundary-healing additive includes compounds containing a phosphorus (P) compound. The use of grain-boundary-healing additives including compounds containing P may be useful where the frit comprises a Bi/Zn/B/O-based glass, for example. However, it will be understood that different glass frit types may benefit from different compounds in the grain-boundary-healing additive.

A basic phosphorus compound for use as the grain-boundary-healing additives may comprise phosphoric acid. Phosphoric acid is soluble in polar solvents such as ethanol and glycol ethers. However, the phosphoric acid compound may cross-link resins in organic binders that are normally used in enamel pastes. The enamel pastes containing phosphoric acid therefore may display poor burn out upon firing.

Other classes of phosphorus compounds that may be used as the grain-boundary-healing additives include phosphites, phosphonites, phosphates and phosphonates.

Phosphites are compounds where P is in a 3+ oxidation state and where P—O—C linkages exist between the P atom and the rest of the organic parts of the molecule.

Phosphonites are compounds where the P atom is in a 3+ oxidation state and where P—C bonds link the phosphorus to the organic portions of the molecule.

Phosphates are compounds where the P atom is in the 5+ oxidation state and where P—O—C linkages exist between the P atom and the organic portion of the molecule.

Phosphonates are compounds where phosphorus is in a 5+ oxidation state and where P—C bonds link the phosphorus to the organic portions of the molecule.

In one embodiment, the grain-boundary-healing additive includes phosphonate compounds. Phosphonate compounds are miscible in the organic solvents commonly used for enamel paste compositions applied by screen printing and other application methods. Further, enamel pastes containing phosphonate compounds do not decompose upon standing such as those enamel pastes that incorporate phosphonite compounds. Unlike phosphoric acid, phosphonate compounds do not cross-link the resins commonly used in enamel pastes and thus the resins burn out more cleanly upon firing of the enamel pastes.

When the phosphonate compound possesses hydroxyl functionality, it is believed that the compound engages in hydrogen bonding with the ground frit in the glass enamel paste. This bonding serves to slow or stop evaporation of the phosphonate compound during drying of the paste so that the phosphonate compounds can remain in the coating to dissolve the impurities present on the surface of the glass frit particles.

While not being bound to any particular theory, it is believed that there are at least three different mechanisms by which the grain-boundary-healing compounds reduce haze in fired enamel coatings. Theses mechanism will be described in more detail below.

Decomposition of Alkali or Alkaline Earth Bicarbonates or Carbonates.

As previously mentioned, milling of the glass batch to produce glass frit can result in relatively large amounts of alkali metals (Li, Na, K, Rb, Cs), alkaline earth metals (Mg, Ca, Sr, Ba) and boron (B) on the surface of the frit particles. For instance, sodium content in oxide glasses is usually represented as $Na_2O$. Sodium oxide reacts with water used in the milling process to produce hydroxide species as in the following representative reaction.

$$Na_2O + H_2O \rightarrow 2NaOH \qquad \text{Reaction 1.}$$

When the frit is dried after milling, the sodium hydroxide species (NaOH) dries on the surface of the frit particles. Upon exposure to atmospheric carbon dioxide, the hydroxide species forms carbonates and bicarbonates as in the following representative reactions.

$$2NaOH_{(glass\ frit\ surface)} + CO_2 \rightarrow Na_2CO_3 + H_2O \qquad \text{Reaction 2.}$$

$$NaOH_{(glass\ frit\ surface)} + CO_2 \rightarrow NaHCO_3 \qquad \text{Reaction 3.}$$

These carbonates and bicarbonates of sodium, along with carbonates and bicarbonates of other alkali and alkaline earth oxides on the surface of the frit particles, serve to disrupt the fusion of glass grains during the firing process.

In one embodiment, organometallic compounds are used as grain-boundary-healing compounds. The organometallic compounds possess a metal atom which forms a metal oxide on the surface of the glass frit particles after the organic components are burned away by oxidation, as in Reaction 4 below. Water formed during the decomposition process can combine with the metal oxide to form an acidic species, such as phosphoric acid, as seen in Reaction 5 below. While not being bound to any particular theory, it is believed that acid causes the decomposition of hydroxides, carbonates, and bicarbonates that are present on the surface of the glass frit particles. During firing, the decomposed hydroxides, carbonates and bicarbonates, now present as phosphate species, can then be dissolved into the softened glass enamel, rather than standing between the frit particles preventing fusion of the particles, see Reaction 8 below.

Accordingly, the frit particles fuse together more completely because at least a portion of the hydroxides, carbonates and bicarbonates on the surface of the frit particles have been removed from the surfaces of the frit particles. As a result, the fired enamel coating displays a reduction in the number of boundaries between the frit particles and a reduction in haze in the fired enamel coating is realized compared to an enamel coating not being treated with a grain-boundary-healing compound.

In a situation where a phosphonate compound is used as a grain-boundary-healing additive, the phosphonate additive first decomposes upon heating to a phosphate species, as ideally represented by the following representative reaction:

$$4[(H_3CH_2C)_2(P=O)CHOH] + 33O_2 \rightarrow 2P_2O_5 + 20CO_2 + 24H_2O \qquad \text{Reaction 4.}$$

Water formed in the composition process can combine with the phosphorus pentoxide to form phosphoric acid, as in the following representative reaction:

$$P_2O_5 + 3H_2O \rightarrow 2H_3PO_4 \qquad \text{Reaction 5.}$$

Of course, the phosphate species (e.g. $H_3PO_4$) could vary somewhat from this representation, since it could be adsorbed on the surface of the frit particles. The phosphate would then react with the carbonates and bicarbonates on the glass particle surface, as represented by the following two reactions (both written ideally with full reaction of the phosphate to the most basic sodium salt):

$$3NaHCO_3 + H_3PO_4 \rightarrow Na_3PO_4 + 3CO_2 + 3H_2O \qquad \text{Reaction 6.}$$

$$3Na_2CO_3 + 2H_3PO_4 \rightarrow 2Na_3PO_4 + 3CO_2 + 3H_2O \qquad \text{Reaction 7.}$$

Of course, if phosphoric acid is dried directly onto the frit powder, Reactions 6 and 7 are accessed directly. These reactions are carried out before firing. As such, the resulting carbon dioxide and water vapor would be expelled from the frit before firing, and is therefore not trapped in the enamel coating upon cooling.

The resulting ionic salt, (e.g. alkaline phosphate species, $Na_3PO_4$) easily dissolves into the molten glass during firing and dose not inhibit the fusion of glass frit particles, as seen in Reaction 8:

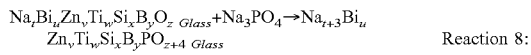

$Na_rBi_uZn_vTi_wSi_xB_yO_{z\ Glass} + Na_3PO_4 \rightarrow Na_{r+3}Bi_u Zn_vTi_wSi_xB_yPO_{z+4\ Glass}$   Reaction 8:

In this way, the grain-boundary-healing additive helps to heal the grain boundaries between the particles of ground glass by removing the carbonate and bicarbonate species from the surface of the frit particles. As a result, the frit particles are then able to fuse together more readily and the enamel coating displays a reduction in the number of grain boundaries with a corresponding reduction in the amount of haze for the enamel coating compared to a coating made without the addition of a grain-boundary-healing additive.

While not being bound to any particular theory, it is also believed that decomposing the surface contaminants (e.g. hydroxides, carbonates and bicarbonates) prevents haze from forming in the fired enamel coating by at least two additional mechanisms.

Prevention of Crystallization.

First, the dissolution of surface contaminants inhibits the formation of potential seed crystals at the surface of the glass frit particles as previously described, wherein such seed crystals could cause the growth of larger crystals during the firing process.

As previously discussed, seed crystal compositions such as $Zn_2SiO_4$ or $Bi_4Si_3O_{12}$, may be present at higher amounts due to the leaching of alkaline and alkaline earth species from the glass frit during grinding. To address the nucleation of larger crystals around the seed crystals, phosphoric acid or alkali phosphate species from the reactions above, and/or the inorganic mineralizers above may be used to inhibit the nucleation of crystals in the glass during the firing process, as represented by Reaction 9:

$Na_rBi_uZn_vTi_wSi_xB_yO_{z\ Glass} + Zn_2SiO_{4\ Crystal} + Na_3PO_4 \rightarrow Na_{r+3}Bi_uZn_{v+2}Ti_wSi_{x+1}B_yPO_{z+8\ Glass}$   Reaction 9:

Prevention of Entrapment of Bubbles.

Second, if the amount of carbonates and bicarbonates impurities is not addressed, then the impurities may decompose during a firing process to form $CO_2$ gas in the bulk of the enamel coating. That is, the impurities would decompose during firing if they were not initially dissolved, at least in part, by the grain-boundary-healing compound. The decomposition of carbonates or bicarbonates during the firing process would generate carbon dioxide in proportion to the amount of carbonates or bicarbonates on the surface of the frit, which would cause bubbling in the molten enamel coating as the gas tried to escape from the bulk of the molten enamel coating. Upon cooling, the $CO_2$ gas would produce carbon inclusions or gas bubbling, which manifests itself as dispersed gas bubbles trapped in the cooled enamel coating.

In contrast, the grain-boundary-healing additive dissolves at least some of the carbonates and bicarbonates on the surface of the frit particles. As a result, a reduced amount of carbon dioxide gas is formed during firing of the enamel coatings compared to an enamel coating not treated with a grain-boundary-healing additive. This is because there is a reduced amount of carbonates and bicarbonates present to decompose into $CO_2$ gas.

When a grain-boundary-healing additive is used, an acidic additives produced in Reaction 5 above (e.g. $H_3PO_4$) react with the carbonates and bicarbonates prior to firing to produce $CO_2$ gas, water, and the corresponding ionic salt (e.g. $Na_3PO_4$). That is, at least a portion of the carbonates and bicarbonates can decompose in a reaction performed at room temperature, as shown for example in Reactions 6-7. In this way, the $CO_2$ gas and water products from Reactions 6-7 will not be produced during a firing step, but will be produced before the frit is melted. In this way the $CO_2$ gas and water products are released from the enamel paste before a firing operation is performed, i.e. before the frit is melted, and therefore cannot be trapped in the bulk of the enamel coating upon cooling. As for the ionic salt, it is easily dissolved in the enamel coating and does not produce haze.

Other sources of gas bubbles in the enamel coating may be present, for example as a result of water being adsorbed on the surface of the glass frit, or as a result of air being whipped into the paste during milling and coating operations. When the frit is heated during firing, the chemically bound water or whipped in air may produce gas bubbles in the bulk of the enamel coating. However, the use of inorganic grain-boundary-healing additives addresses such production of gas bubbles by acting to lower the viscosity of the molten enamel. The lowered viscosity of the molten enamel allows the gas bubbles to more easily exit the bulk of the molten enamel so that the bubbles are not trapped in the enamel coating upon cooling. The lower bubble content in the cooled enamel coating results in a higher clarity coating, i.e. less haze.

It is also believed that the acidic additives produced in Reaction 5 above will prevent further formation of carbonates and bicarbonates on the surface of the glass frit. This may be similar to the use of small amounts of phosphate stabilizers in concentrated NaOH solutions to prevent $Na_2CO_3$ and $NaHCO_3$ formation.

In one embodiment, a grain-boundary-healing component is added to a frit slurry during the frit milling step. In this instance, the grain-boundary-healing component is then dried on the surface of the frit particles during a drying step. The frit, having the grain-boundary-healing component dried on a surface thereof, it then added to an organic carrier to form an enamel paste.

In another embodiment, a grain-boundary-healing component is added to the organic carrier or to the enamel paste after fritting of the glass batch. When the enamel paste is applied to a substrate and dried by heating to remove any liquid component from the paste, the grain-boundary-healing component is dried on the surfaces of the frit particles.

Transparent Coatings

In one aspect, a grain-boundary-healing additive, e.g. an organometallic compound, is added directly to an enamel paste comprising glass frit and an organic carrier. In another aspect, a grain boundary healing additive is dispersed in a liquid or dissolved into a solvent, e.g. water, alcohols, glycols, glycol ethers and the like. Glass frit powders are then mixed with the suspension or solution that includes the grain boundary healing additive, in order to form a slurry. The slurry can then be dried and the glass frit powder de-agglomerated, producing glass frit having the grain boundary healing additive on a surface of the glass frit particles. The glass powders are then dispersed into organic carriers to form enamel pastes.

In either aspect, the enamel pastes can then be applied to a substrate, e.g. a glass substrate, and fired to give enamel coatings with improved transparency. In the case of a transparent enamel coating, the addition of grain boundary healing additives improves transparency of such enamel coating and reduces haze compared to coatings not treated with a grain boundary healing compound.

Transparent Colored Coatings

In another embodiment, the grain boundary healing additives can be used to make colored glass coatings with improved transparency. In one aspect, a coloring agent, such as coloring ions for example, is added along with the various oxides and fired to produce a glass batch. Examples of material that supplies coloring ions are cobalt to produce blue glasses, manganese to produce brown glasses, silver colloids to produce yellow-amber glass, and copper and gold colloids to produce red glasses. Many other coloring agent species and combinations may be possible as known to those skilled in the art.

After smelting and quenching the glass batch, the resulting amorphous solid is ground to the desired particle size to produce glass frit. A grain-boundary-healing additive may be added to the mill during the last stages of milling, so that the additive is dried onto the surface of the frit particles during the normal drying process.

In another aspect, coloring ions can be added into the enamel paste itself. In one aspect, cobalt nitrate is dissolved in a water miscible medium. The medium is used to disperse the glass frit treated with a grain-boundary-healing additive as described above to thereby produce an enamel paste. Upon firing, the molten frit acts to attack and dissolve the coloring ions into the enamel to provide a color to the enamel, while the grain boundaries are healed due to the addition of the grain-boundary-healing additive. The result is a transparent colored enamel coating.

In yet another aspect, a fore hearth method is used to produce a colored enamel coating. In this aspect, a low-melting glass batch base is formed by the addition and melting of certain oxides and/or other glass forming raw materials, and the glass batch is held molten in a tank. Portions of the glass batch base are colored by introducing a coloring agent, for example a coloring concentrate material such as a material including a mixed metal oxide pigment, with the molten glass batch. After thorough mixing of the color concentrate to a portion of the molten glass batch base in the fore hearth, the colored portion of the glass batch base is quenched by a technique such as water quenching, roll quenching or a combination thereof, where a roll-quenched material is rolled into water to complete the quenching process. Other portions of the glass batch base can be colored differently to produce transparent colored frit of different colors.

After quenching, the amorphous solid material is ground to a suitably fine frit powder using standard grinding techniques such as ball milling, attritor milling, bead milling or air milling. During the milling process, grain-boundary healing additives are added to the mill, as described above. An enamel paste is formed by adding the frit to a carrier. After applying the enamel paste to all or part of the surface of a substrate, e.g. a glass substrate, the paste will be dried to remove any liquid from the paste and fired to burn off any remaining components of the carrier and to fuse the glass frit, thereby yielding a transparent, colored enamel coating on the substrate.

Opaque Enamels with Improved Color Development.

Grain-boundary-healing additives can also be used to help improve the appearance of opaque enamels by improving the color development in such enamels. If the additives are used in opaque enamels, the carbonates and bicarbonates are removed from the surfaces of the glass frit particles. As a result, the glass frit more completely fuses. Further, less $CO_2$ is produced in the enamel firing process and fewer bubbles are trapped in the enamel coating upon cooling. Further, the grain-boundary-healing additives lower the viscosity of the molten enamel, which results in better flow. Because there is less $CO_2$ and because there is improved flow, fewer bubbles are produced and trapped in the resulting enamel coating. Less bubbling reduces the amount of grain boundaries between the glass frit. The resulting enamels therefore show better color development because there is less scatting of light to adversely affect the observed color of the coating.

For example, black enamel could be darker in appearance due to lower amounts of scattering from grain boundaries and bubbles in the frit. Healing of grain boundaries may also produce other advantageous properties in glass enamel, such as improvement is acid resistance.

Glass Frits

The raw material used to make the glass frit is not particularly limited by the present subject matter, and may be chosen from several glass systems known in the industry, as detailed for example in Tables 1-6. Other glasses not detailed in these tables may be useful for the present subject matter, provided that a proper grain-boundary-healing component is chosen for each specific glass composition.

The ground glass frit particles can have an average particle size that may be chosen for a particular application. In one embodiment, the glass frit particles have a D50 average particle size of 0.4 to 40 microns, from about 0.5 to 20 microns or from about 0.6 to 10 microns. Additionally, the frit's coefficient of thermal expansion may be matched to that of the substrate in order to avoid cracking of the enamel or peeling of the enamel form the substrate from temperature fluctuations.

Historically, lead-bearing frits were known in the art to provide relatively transparent fired films. Several factors could contribute to this behavior. Low viscosity glasses can result from high lead content, so the softened or molten glass can flow out well and allow any gas that results from the firing process to escape. Exposing lead oxide surfaces during milling may result in relatively smaller amounts of hydroxides on the surface, in turn leading to smaller amounts of carbonates and bicarbonates. Below, Examples 5-23 and Table 9 are offered as comparative examples.

Table 1 below offers broad ranges for individual oxides that may be used in Ba—Bi—Zn—B-based oxide glass frits.

TABLE 1

| Oxide (Mole %) | Glass Batch 1 | Glass Batch 2 | Glass Batch 3 | Glass Batch 4 | Glass Batch 5 | Glass Batch 6 |
| --- | --- | --- | --- | --- | --- | --- |
| $Bi_2O_3$ | 25-65 | 30-60 | 32-55 | 35-50 | 37-45 | 30-42 |
| ZnO + BaO | 3-60 | 10-50 | 15-45 | 20-40 | 30-40 | 25-35 |
| $B_2O_3$ | 4-65 | 7-60 | 10-50 | 15-40 | 18-35 | 18-35 |
| $SiO_2 + Al_2O_3$ | 0-50 | 0-30 | 0-20 | 0.1-10 | 0.1-8 | 3-10 |

Table 2 below, offers broad ranges for individual oxides that may be used in Bi—B—Si-based oxide glass frits.

TABLE 2

| Oxide (Mole %) | Glass Batch 7 | Glass Batch 8 | Glass Batch 9 |
| --- | --- | --- | --- |
| $Bi_2O_3$ | 5-85 | 10-75 | 12-50 |
| $SiO_2 + B_2O_3$ | 5-75 | 15-75 | 34-71 |
| $Li_2O + Na_2O + K_2O + Rb_2O + Cs_2O$ | 0-40 | 5-30 | 10-30 |
| ZnO | 0-55 | 0-20 | 0-12 |
| $TiO_2 + ZrO_2$ | 0-20 | 0-10 | 1-6 |
| MgO + CaO + SrO + BaO | 0-20 | 0-15 | 0-10 |

Table 3 below, offers broad ranges for individual oxides that may be used in Zn—Si—B-based oxide glasses.

TABLE 3

| Oxide (Mole %) | Glass Batch 10 | Glass Batch 11 | Glass Batch 12 |
|---|---|---|---|
| ZnO | 5-65 | 7-50 | 10-32 |
| $SiO_2$ | 10-65 | 20-60 | 22-58 |
| $B_2O_3$ | 5-55 | 7-35 | 10-25 |

Table 4 below, offers broad ranges for individual oxides that may be used in Pb—B—Si-based oxide glasses.

TABLE 4

| Oxide (Mole %) | Glass Batch 13 | Glass Batch 14 | Glass Batch 15 |
|---|---|---|---|
| PbO | 15-75 | 25-66 | 50-65 |
| $SiO_2 + B_2O_3 + Al_2O_3$ | 5-75 | 20-55 | 24-45 |
| ZnO | 0-55 | 0.1-35 | 0.1-25 |
| $Li_2O + Na_2O + K_2O + Rb_2O + Cs_2O$ | 0-40 | 0-30 | 0-10 |
| $TiO_2 + ZrO_2$ | 0-20 | 0-10 | 0.1-5 |
| $MgO + CaO + SrO + BaO$ | 0-20 | 0-15 | 0-10 |

Table 5 below, offers broad ranges for individual oxides that may be used in Alkali-Ti—Si-based oxide glasses.

TABLE 5

| Oxide (Mole %) | Glass Batch 16 | Glass Batch 17 | Glass Batch 18 |
|---|---|---|---|
| $Li_2O + Na_2O + K_2O + Rb_2O + Cs_2O$ | 5-55 | 15-60 | 30-40 |
| $TiO_2 + ZrO_2$ | 0-26 | 1-26 | 1.5-22 |
| $SiO_2 + B_2O_3$ | 5-75 | 25-70 | 30-52 |
| ZnO | 0-55 | 0.1-35 | 0.1-25 |
| $V_2O_5 + Sb_2O_5 + P_2O_5$ | 0-30 | 0.25-25 | 5-25 |
| $MgO + CaO + SrO + BaO$ | 0-20 | 0-15 | 0-10 |
| F | 0-20 | 0-15 | 5-13 |

In Table 5, above, a range of 0-60 mole % $V_2O_5+Sb_2O_5+P_2O_5$ is also contemplated. In Table 5 and in all tables herein, values from different columns in the same table may be used together to form further embodiments.

Table 6 below, offers broad ranges for individual oxides that may be used in Pb—Bi—B—Si-based oxide glasses.

TABLE 6

| Oxide (Mole %) | Glass Batch 18 | Glass Batch 19 | Glass Batch 20 |
|---|---|---|---|
| $PbO + Bi_2O_3$ | 15-75 | 25-66 | 50-65 |
| $SiO_2 + B_2O_3 + Al_2O_3$ | 5-75 | 20-55 | 24-45 |
| ZnO | 0-55 | 0.1-35 | 0.1-25 |
| $Li_2O + Na_2O + K_2O + Rb_2O + Cs_2O$ | 0-40 | 0-30 | 0-10 |
| $TiO_2 + ZrO_2$ | 0-20 | 0-10 | 0.1-5 |
| $MgO + CaO + SrO + BaO$ | 0-20 | 0-15 | 0-10 |

In any glass batch herein, wherever a range including $SiO_2$ or $B_2O_3$ is listed, the respective range may also include $TeO_2$ contemplated as $(SiO_2+TeO_2)$ or $(B_2O_3+TeO_2)$ or $(SiO_2+N_2O_3+TeO_2)$.

In any embodiment of the present subject matter, the materials listed in Table 7 below, may also be added to the glass batch. These additives provide the glass batch with color or other desired properties. The additives can be used in any combination.

Table 7 below, offers broad ranges of coloring agent additives that may be added to the glass batch.

TABLE 7

| Coloring Agent | Amount (Mole %) |
|---|---|
| $V_2O_5$ | 0-5 |
| $Cr_2O_3$ | 0-5 |
| $MnO_2$ | 0-5 |
| $Fe_2O_3$ | 0-5 |
| CoO | 0-5 |
| NiO | 0-5 |
| CuO | 0-5 |
| $Ga_2O_3$ | 0-5 |
| $GeO_2$ | 0-5 |
| $Nb_2O_5$ | 0-5 |
| $MoO_3$ | 0-5 |
| $Ag_2O$ | 0-5 |
| $In_2O_3$ | 0-5 |
| $La_2O_3$ | 0-5 |
| $WO_3$ | 0-5 |
| $SnO_2$ | 0-5 |
| $Sb_2O_3$ | 0-5 |
| $SO_3 + SeO_2 + TeO_2$ | 0-5 |

In the above table and in all tables herein, each range bounded by zero also represents a range bounded by 0.1 at the lower end.

Other additives besides those listed, such as glass network intermediates and glass modifiers such as fluoride, may be added in order attain other desired properties of the enamel coatings. Further, the firing of the enamel pastes may be conducted in alternative atmospheres, such as in an inert or reducing atmospheres or under vacuum, in order to give the enamel coating certain desired properties. All of these modifications will be evident to those skilled in the art and would not depart from the intent of this technology.

Enamel Powder

In another embodiment, a dry enamel powder, as opposed to an enamel paste, is applied to a substrate and fired to create an enamel coating. Such application can be accomplished by electrostatic coating techniques. The dry enamel powder may include the following components, given in weight percent of the whole powder.

In one embodiment, one or more types of glass frit as described above in Tables 1-6 may be present in a range of from about 40-100%, about 45-100%, or about 50-100%.

The enamel powder may also include an expansion-coefficient-modifying filler to adjust the glass enamel expansion coefficient so that it is closer with the expansion coefficient of the substrate. In one aspect, the expansion coefficient of the enamel is lowered to match that of the substrate, e.g. a glass substrate.

Suitable fillers may also be included in the enamel powder, such as β-eucryptite ($LiAlSiO_4$), cordierite (Al/Si/O phase), fused silica ($SiO_2$), zircon ($ZrSiO_4$), ground Pyrex powder, and negative thermal expansion materials like $ZrW_2O_8$ and $ZrMo_2O_8$. Other expansion reducing materials may be used. The expansion reducing filler is optional, but when present, is present in a range of about 0-30%, 0-25%, or about 0-20%. In another aspect, expansion-increasing fillers may be added to the enamel powder. Crystobalite is suitable for use as an expansion-increasing filler, which could be added in a range of, broadly, 0-30%, 0-25%, or 0-20%.

Pigments may also be added to the dry enamel powder to provide color to the fired enamel coating. Pigment additives may be included in a range of about 0-35%, about 0-30%, or about 0-25%. The pigment may be in particle or powder form and may have a relatively small particle size in order to not substantially impair the transparency of the fired enamel. In order for the fired enamel to remain transparent, a pigment may have an average particle size of less than about 1 micron, less than about 0.85 microns, or less than about 0.7 microns.

Enamel Paste

Suitable glass enamels pastes for use in the instant subject matter consist of ground glass particles (i.e. frit), fillers, pigments and an organic vehicle suitable for an intended application process.

The dry powder includes glass frit having a composition as described above, and may be dispersed in an organic carrier/vehicle comprising for example, an organic binder and a solvent, to form an enamel paste. The paste may be applied to a substrate, e.g. a glass substrate, and fired in order to produce an enamel coating on the substrate.

The enamel paste may be formulated so that it is suitable for application by screen printing, for example. Other application methods such as roll coating, curtain coating, pad printing, ink jet printing and spraying could be used to apply the enamel paste to a substrate without departing from the present subject matter.

In one embodiment, a method of preparing glass enamel on a substrate is provided. The method includes providing an enamel paste including a glass frit and an organic carrier. The organic carrier includes a grain-boundary-healing additive dissolved therein. The method includes applying the enamel paste to a substrate and firing the enamel paste to burn out the organic carrier, thereby treating the frit with the grain boundary healing additive and finally fusing the glass frit to thereby prepare glass enamel on the substrate.

In another embodiment, a method of preparing colored glass enamel on a substrate is provided. The method includes providing an enamel paste including a glass frit and an organic carrier. The organic carrier includes a grain-boundary-healing additive and a coloring additive dissolved into the organic carrier. The method includes applying the enamel paste to a substrate and firing the enamel paste to burn out the organic carrier, thereby treating the frit with the grain boundary healing additive and the coloring additive and finally fusing the glass frit to thereby prepare colored glass enamel on the substrate.

EXAMPLES

The following examples are intended only to illustrate the present subject matter and should not be construed as imposing limitations upon the claims. Each glass sample was prepared as noted below. Optical data was obtained on a BYK-Gardner Haze-Gard Plus, Illuminant C. Values for % Transmission (% T), % Haze (% H) and % Clarity (% C) were obtained on this unit and were recorded in Table 1.

Example 1

A 3"×3"×0.7 mm pane of soda-lime glass was used as received. Optical data on this pane was obtained to act as a comparative example.

Example 2

15 g of A87 frit, an experimental ground glass chosen from the compositional range of Table 4, and 3 g of C92 Medium, available from Ferro Corporation, were weighed onto a glass pane and were mulled together with a spatula until smooth and homogeneous. The resulting paste was screen-printed with a 305-Mesh/inch nylon screen onto 3"×3"×0.7 mm soda lime glass panes. The glass was fired flat on a piece of 3"×3"×1 mm alumina. The alumina plate was placed on a metal mesh and fired at 400° C. for 10 minutes and then at 600° C. for 10 minutes. After firing, the pane was cooled. The fired enamel coating was relatively transparent and glossy in appearance. The pane was submitted to optical characterization on the haze meter to act as a comparative example.

Example 3

15 g of S403 frit, an experimental ground glass chosen from the compositional range of Table 2, and 3.5 g of C92 Medium, available from Ferro Corporation, were weighed onto a glass pane and were mulled together with a spatula until smooth and homogeneous. The resulting paste was screen-printed with a 305-Mesh/inch nylon screen onto 3"×3"×0.7 mm soda lime glass panes. The glass was fired flat on a piece of 3"×3"×1 mm alumina. The alumina plate was placed on a metal mesh and fired at 400° C. for 10 minutes and then at 600° C. for 10 minutes. After firing, the pane was cooled. The fired coating displayed a milky haze and had a glossy upper surface. The pane was submitted to optical characterization on the haze meter to act as a comparative example.

Example 4

15 g of S403 frit, 1.5 g of diethoxy hydroxymethylphosphonate (i.e. phosphonate grain-boundary-healing additive), available from Wilshire Technologies, and 3 g of C92 Medium, available from Ferro Corporation, were weighed onto a glass pane and were mulled together with a spatula until smooth and homogeneous. The resulting paste was screen-printed with a 305-Mesh/inch nylon screen onto 3"×3"×0.7 mm soda lime glass panes. The glass was fired flat on a piece of 3"×3"×1 mm alumina. The alumina plate was placed on a metal mesh and fired at 400° C. for 10 minutes and then at 600° C. for 10 minutes. After firing, the pane was cooled. The fired coating was relatively transparent and had a glossy upper surface. The pane was submitted to optical characterization on the haze meter to act as an inventive example.

Table 8 shows the optical data of Examples 1-4.

TABLE 8

Optical Data for Examples 1-4.

| Trial # | Frit Chemistry | Grain-Boundary-Healing Additive Present? | % Transmission | % Haze | % Clarity |
|---|---|---|---|---|---|
| Example 1 | NA | NA | 93.0% | 0.09% | 100% |
| Example 2 | Table 4 | No | 88.8% | 0.64% | 81.3% |
| Example 3 | Table 2 | No | 83.7% | 7.71% | 95.4% |
| Example 4 | Table 2 | Yes | 86.6% | 1.44% | 99.0% |

Here, percent transmission (% T) is measured at a particular wavelength (or wavelength range) and is the ratio of transmitted light intensity ($I_t$) to incident light intensity ($I_o$), expressed as a percentage: % T=$I_t/I_o$·100. Haze is defined as the percent of the light that deviates at an angle from an incident beam by more than 2.5 degrees. Haze (% H) is a measure of the high angle scatter of light in the sample. Values of haze that are less than 1% are desired because the human eye only begins to perceive the haze at the 1% value. Clarity (% C) is defined as the percentage of the light that deviates at an angle from an incident beam by less than 2.5 degrees.

In Table 8, Example 1 is the bare substrate glass. As expected this sample shows a % transmission (% T) of 93% for the 0.7 mm thick pane of glass. The % haze (% H) value is near zero. The blank glass also possesses a clarity value of 100%.

Example 2, which is a lead-bearing glass enamel coating not utilizing a grain-boundary-healing additive, has desirable values for % T and % H, but its value for % C is quite low.

Example 3, which is lead-free glass enamel coating not utilizing a grain-boundary-healing additive, has the lowest value of % T and the highest value of % H among those evaluated. Example 3 showed a slight milky white appearance, as indicated by the high haze value (7.71%). Other lead-free frits demonstrate similar behavior when fired by themselves.

Example 4, which is a glass enamel coating utilizing a grain-boundary-healing additive in accordance with the present subject matter, has values of % T, % H and % C that are more desirable compared to those of Example 3. The % T has increased to 86.6%, the % H has fallen to a value of 1.44%, and the % C has risen to a value of 99%, the highest of all of the coated samples.

Lead-Bearing Frit Examples

Example 5

An enamel paste was made by dispersing 15 g of EG2760 glass frit into 3 g of C92 Medium and 2 g of RD-3426 Medium both available from Ferro Corporation. EG2760 is a ground glass available from Ferro Corporation from the compositional range of Table 4, and was chosen for study due to its good flow properties. The enamel paste was printed onto glass panes through a 390-Mesh screen and the panes were dried on a hotplate. After drying, the panes were fired flat on a 3"×3" sheet of alumina for 10 minutes at 400° C. and then for 10 minutes at an elevated firing temperature as noted in Table 9. After cooling, the optical properties of the sample were obtained on the Haze-Gard Plus, Illuminant C and the results were recorded in Table 9.

Example 6

1 g of phosphoric acid ($H_3PO_4$, 85% in water, available from Thermo Fisher Scientific) and approximately 45 g deionized (DI) water were mixed together in a beaker. The solution was poured over 100 g of EG2760 frit, which was first weighed onto a plate. The components were stirred together to form a slurry. The plate was placed in a force drier at 105° C. and heated until the slurry dried. The dried powder was loosened from the plate with a spatula during the drying process to ensure complete dryness. After drying, the frit was sieved through a 230-Mesh screen before use. 15 g of the modified frit was dispersed into 3 g of C92 Medium and 2 g of RD-3426 Medium. The paste was treated as above in Example 5 and the results were recorded in Table 9.

Example 7

3 g of hexafluorosilicic acid ($H_2SiF_6$, 35% in water, available from Alfa) and approximately 45 g DI water were mixed together in a beaker. The solution was poured over 100 g of EG2760, weighed onto a plate. The components were stirred together to form a slurry. The plate was placed in a force drier at 105° C. and heated until the slurry dried. The powder was loosened from the plate with a spatula during the drying process to ensure complete dryness. After drying, the frit was sieved through a 230-Mesh screen before use. 15 g of the modified frit was dispersed into 3 g of C92 Medium and 2 g of RD-3426 Medium. The paste was treated as in Example 5 and the results were recorded in Table 9.

Example 8

1 g of sodium hexafluorosilicate ($Na_2SiF_6$), 1 g sodium nitrate ($NaNO_3$), 1 g of hexaflurosilicic acid (35% in water) and approximately 45 g DI water were mixed together in a beaker. The $Na_2SiF_6$ and $NaNO_3$ were taken from commercially available starting materials at Ferro Corporation. The hexafluorosilicate salt did not completely dissolve into the solution. The solution was poured over 100 g of EG2760, weighed onto a plate. The components were stirred together to form a slurry. The plate was placed in a force drier at 105° C. and heated until the slurry dried. The powder was loosened from the plate with a spatula during the drying process to ensure complete dryness. After drying, the frit was sieved through a 230-Mesh screen before use. 15 g of the modified frit was dispersed into 3 g of C92 Medium and 2 g of RD-3426 Medium. The paste was treated as in Example 5 and the results were recorded in Table 9.

Example 9

1 g of potassium hexafluorosilicate ($K_2SiF_6$), 1 g potassium nitrate ($KNO_3$), 1 g of hexafluorosilicic acid ($H_2SiF_6$, 35% in water) and approximately 45 g DI water were mixed together in a beaker The $K_2SiF_6$ and $KNO_3$ were taken from commercially available starting materials at Ferro Corporation. The hexafluorosilicate salt did not completely dissolve into the solution. The solution was poured over 100 g of EG2760, weighed onto a plate. The components were stirred together to form a slurry. The plate was placed in a force drier at 105° C. and heated until the slurry dried. The powder was loosened from the plate with a spatula during the drying process to ensure complete dryness. After drying, the frit was sieved through a 230-Mesh screen before use. 15 g of the modified frit was dispersed into 3 g of C92 Medium and 2 g of RD-3426 Medium. The paste was treated as in Example 5 and the results were recorded in Table 9.

Example 10

1 g of tetrafluoroboric acid ($HBF_4$, 50% in water, available from Alfa Aesar) and approximately 45 g DI water were mixed together in a beaker. The solution was poured over 50 g of EG2760, weighed onto a plate. The components were stirred together to form a slurry. The plate was placed in a force drier at 105° C. and heated until the slurry dried. The powder was loosened from the plate with a spatula during the drying process to ensure complete dryness. After drying, the frit was sieved through a 230-Mesh screen before use. 15 g of the modified frit was dispersed into 3 g of C92 Medium and 2 g of RD-3426 Medium. The paste was treated as in Example 5 and the results were recorded in Table 9.

Example 11

1 g of hexafluorophosphoric acid ($HPF_6$, 60% in water, available from Alfa Aesar) and approximately 45 g DI water were mixed together in a beaker. The solution was poured over 50 g of EG2760, weighed onto a plate. The components were stirred together to form a slurry. The plate was placed in a force drier at 105° C. and heated until the slurry dried.

The powder was loosened from the plate with a spatula during the drying process to ensure complete dryness. After drying, the frit was sieved through a 230-Mesh screen before use. 15 g of the modified frit was dispersed into 3 g of C92 Medium and 2 g of RD-3426 Medium. The paste was treated as in Example 5 and the results were recorded in Table 9.

Example 12

1 g of hexafluoroantimonic acid ($HSbF_6$, 65% in water, available from Alfa Aesar) and approximately 45 g DI water were mixed together in a beaker. The solution was poured over 50 g of EG2760, weighed onto a plate. The components were stirred together to form a slurry. The plate was placed in a force drier at 105° C. and heated until the slurry dried. The powder was loosened from the plate with a spatula during the drying process to ensure complete dryness. After drying, the frit was sieved through a 230-Mesh screen before use. 15 g of the modified frit was dispersed into 3 g of C92 Medium and 2 g of RD-3426 Medium. The paste was treated as in Example 5 and the results were recorded in Table 9.

Example 13

1 g of dihydrogen hexafluorozirconate ($H_2ZrF_6$, 45% in water, available from Alfa Aesar) and approximately 45 g DI water were mixed together in a beaker. The solution was poured over 50 g of EG2760, weighed onto a plate. The components were stirred together to form a slurry. The plate was placed in a force drier at 105° C. and heated until the slurry dried. The powder was loosened from the plate with a spatula during the drying process to ensure complete dryness. After drying, the frit was sieved through a 230-Mesh screen before use. 15 g of the modified frit was dispersed into 3 g of C92 Medium and 2 g of RD-3426 Medium. The paste was treated as in Example 5 and the results were recorded in Table 9.

Example 14

0.5 g of molybdic acid ($H_2MoO_4$, available from Alfa Aesar), 2 g concentrated nitric acid ($HNO_3$, available from Thermo Fisher Scientific) and approximately 45 g DI water were mixed together in a beaker. The mixture was heated in an attempt to dissolve the molybdic acid. Though the compound did not completely dissolve, the resulting mixture was poured over 50 g of EG2760, weighed onto a plate. The components were stirred together to form a slurry. The plate was placed in a force drier at 105° C. and heated until the slurry dried. The powder was loosened from the plate with a spatula during the drying process to ensure complete dryness. After drying, the frit was sieved through a 230-Mesh screen before use. 15 g of the modified frit was dispersed into 3 g of C92 Medium and 2 g of RD-3426 Medium. The paste was treated as in Example 5 and the results were recorded in Table 9.

Example 15

0.5 g of tungstic acid ($H_2WO_4$, available from Alfa Aesar), 2 g concentrated nitric acid ($HNO_3$, available from Thermo Fisher Scientific) and approximately 45 g DI water were mixed together in a beaker. The mixture was heated in an attempt to dissolve the tungstic acid. Though the compound did not completely dissolve, the resulting mixture was poured over 50 g of EG2760, weighed onto a plate. The components were stirred together to form a slurry. The slurry was treated as above to result in a dried powder. 15 g of the modified frit was dispersed into 3 g of C92 Medium and 2 g of RD-3426 Medium. The paste was treated as in Example 5 and the results were recorded in Table 9.

Example 16

0.5 g of telluric acid ($Te(OH)_6$, available from Alfa Aesar), 0.5 g concentrated nitric acid ($HNO_3$, available from Thermo Fisher Scientific) and approximately 45 g DI water were mixed together in a beaker. The mixture was heated to dissolve the telluric acid. The solution was poured over 50 g of EG2760, weighed onto a plate. The components were stirred together to form a slurry. The slurry was treated as above to result in a dried powder. 15 g of the modified frit was dispersed into 3 g of C92 Medium and 2 g of RD-3426 Medium. The paste was treated as in Example 5 and the results were recorded in Table 9.

Example 17

1 g of sodium hexafluorosilicate ($Na_2SiF_6$, from commercially available starting materials at Ferro Corporation) and approximately 25 g DI water were mixed together in a beaker. The mixture was heated in an attempt to dissolve the salt. The salt did not completely dissolve. The mixture was poured over 50 g of EG2760, weighed onto a plate. The un-dissolved salt was rinsed from the beaker onto the plate with DI water washes. The components were stirred together to form a slurry. The slurry was treated as above to result in a dried powder. 15 g of the modified frit was dispersed into 3 g of C92 Medium and 2 g of RD-3426 Medium. The paste was treated as in Example 5 and the results were recorded in Table 9.

Example 18

1 g of potassium hexafluorosilicate ($K_2SiF_6$, from commercially available starting materials at Ferro Corporation) and approximately 25 g DI water were mixed together in a beaker. The mixture was heated in an attempt to dissolve the salt. The salt did not completely dissolve. The mixture was poured over 50 g of EG2760, weighed onto a plate. The un-dissolved salt was rinsed from the beaker onto the plate with DI water washes. The components were stirred together to form a slurry. The slurry was treated as above to result in a dried powder. 15 g of the modified frit was dispersed into 3 g of C92 Medium and 2 g of RD-3426 Medium. The paste was treated as in Example 5 and the results were recorded in Table 9.

Example 19

1 g of sodium hexafluorosilicate ($Na_2SiF_6$) and 1 g of potassium hexafluorosilicate ($K_2SiF_6$, both from commercially available starting materials at Ferro Corporation) and approximately 25 g DI water were mixed together in a beaker. The mixture was heated in an attempt to dissolve the salts. The salts did not completely dissolve. The mixture was poured over 50 g of EG2760, weighed onto a plate. The un-dissolved salts were rinsed from the beaker onto the plate with DI water washes. The components were stirred together to form a slurry. The slurry was treated as above to result in a dried powder. 15 g of the modified frit was dispersed into 3 g of C92 Medium and 2 g of RD-3426 Medium. The paste was treated as in Example 5 and the results were recorded in Table 9.

Example 20

1 g of sodium nitrate (NaNO$_3$, taken from commercially available starting materials at Ferro Corporation) and approximately 25 g DI water were mixed together in a beaker at room temperature to form a transparent solution. The solution was poured over 50 g of EG2760, weighed onto a plate. The beaker was rinsed with DI water and the water was added to the plate. The components were stirred together to form a slurry. The slurry was treated as above to result in a dried powder. 15 g of the modified frit was dispersed into 3 g of C92 Medium and 2 g of RD-3426 Medium. The paste was treated as in Example 5 and the results were recorded in Table 9.

Example 21

1 g of potassium nitrate (KNO$_3$, taken from commercially available starting materials at Ferro Corporation) and approximately 25 g DI water were mixed together in a beaker at room temperature to form a transparent solution. The solution was poured over 50 g of EG2760, weighed onto a plate. The beaker was rinsed with DI water and the water was added to the plate. The components were stirred together to form a slurry. The slurry was treated as above to result in a dried powder. 15 g of the modified frit was dispersed into 3 g of C92 Medium and 2 g of RD-3426 Medium. The paste was treated as in Example 5 and the results were recorded in Table 9.

Example 22

1 g of sodium nitrate (NaNO$_3$) and 1 g of potassium nitrate (KNO$_3$, both taken from commercially available starting materials at Ferro Corporation) and approximately 25 g DI water were mixed together in a beaker at room temperature to form a transparent solution. The solution was poured over 50 g of EG2760, weighed onto a plate. The beaker was rinsed with DI water and the water was added to the plate. The components were stirred together to form a slurry. The slurry was treated as above to result in a dried powder. 15 g of the modified frit was dispersed into 3 g of C92 Medium and 2 g of RD-3426 Medium. The paste was treated as in Example 5 and the results were recorded in Table 9.

Example 23

0.5 g of sodium hexafluorosilicate (Na$_2$SiF$_6$), 0.5 g potassium hexafluorosilicate (K$_2$SiF$_6$), 0.5 g of sodium nitrate (NaNO$_3$) and 0.5 g of potassium nitrate (KNO$_3$, all taken from commercially available starting materials at Ferro Corporation) and approximately 25 g DI water were mixed together in a beaker at room temperature to form a transparent solution. The solution was poured over 50 g of EG2760, weighed onto a plate. The beaker was rinsed with DI water and the water was added to the plate. The components were stirred together to form a slurry. The slurry was treated as above to result in a dried powder. 15 g of the modified frit was dispersed into 3 g of C92 Medium and 2 g of RD-3426 Medium. The paste was treated as in Example 5 and the results were recorded in Table 9.

Table 9 shows the firing temperature and optical properties as measured for Examples 5-23.

TABLE 9

Firing Temperatures and Optical Data Examples 5-23.

| Sample # | Firing Temp. | % Trans. | % Haze | % Clarity |
| --- | --- | --- | --- | --- |
| Blank | NA | 91.9% | 0.18% | 100% |
| Example 5 | 400° C./600° C. | 88.1% | 4.61% | 96.6% |
| Example 5 | 400° C./625° C. | 88.4% | 5.05% | 96.6% |
| Example 5 | 400° C./650° C. | 89.5% | 1.84% | 97.1% |
| Example 6 | 400° C./600° C. | 81.0% | 20.2% | 95.7% |
| Example 6 | 400° C./625° C. | 82.5% | 14.7% | 96.4% |
| Example 6 | 400° C./650° C. | 87.0% | 10.9% | 96.5% |
| Example 7 | 400° C./600° C. | 87.8% | 6.09% | 96.4% |
| Example 7 | 400° C./625° C. | 88.4% | 2.57% | 96.4% |
| Example 7 | 400° C./650° C. | 89.6% | 1.61% | 97.2% |
| Example 8 | 400° C./600° C. | 87.1% | 5.97% | 95.7% |
| Example 8 | 400° C./625° C. | 88.6% | 0.98% | 97.0% |
| Example 8 | 400° C./650° C. | 89.5% | 0.79% | 97.7% |
| Example 9 | 400° C./600° C. | 87.9% | 1.61% | 96.0% |
| Example 9 | 400° C./625° C. | 88.2% | 1.83% | 96.8% |
| Example 9 | 400° C./650° C. | 89.6% | 1.08% | 97.0% |
| Example 10 | 400° C./600° C. | 87.1% | 11.1% | 96.8% |
| Example 10 | 400° C./625° C. | 88.5% | 3.30% | 97.3% |
| Example 10 | 400° C./650° C. | 88.9% | 2.82% | 97.0% |
| Example 11 | 400° C./600° C. | 79.6% | 16.2% | 95.3% |
| Example 11 | 400° C./625° C. | 85.9% | 4.53% | 96.6% |
| Example 11 | 400° C./650° C. | 87.7% | 2.77% | 96.8% |
| Example 12 | 400° C./600° C. | 77.9% | 25.0% | 96.6% |
| Example 12 | 400° C./625° C. | 72.8% | 39.2% | 95.6% |
| Example 12 | 400° C./650° C. | 72.1% | 42.4% | 95.0% |
| Example 13 | 400° C./600° C. | 85.9% | 9.94% | 96.0% |
| Example 13 | 400° C./625° C. | 84.7% | 6.02% | 96.8% |
| Example 13 | 400° C./650° C. | 88.7% | 2.54% | 97.0% |
| Example 14 | 400° C./600° C. | 88.0% | 0.41% | 95.0% |
| Example 14 | 400° C./625° C. | 88.2% | 2.30% | 95.7% |
| Example 14 | 400° C./650° C. | 89.2% | 2.55% | 98.0% |
| Example 15 | 400° C./600° C. | 87.3% | 5.97% | 91.7% |
| Example 15 | 400° C./625° C. | 88.3% | 5.21% | 94.7% |
| Example 15 | 400° C./650° C. | 89.1% | 2.53% | 96.3% |
| Example 16 | 400° C./600° C. | 82.2% | 25.5% | 96.6% |
| Example 16 | 400° C./625° C. | 85.5% | 16.4% | 96.8% |
| Example 16 | 400° C./650° C. | 77.7% | 4.87% | 96.9% |
| Example 17 | 400° C./600° C. | 87.7% | 2.96% | 96.3% |
| Example 17 | 400° C./625° C. | 88.4% | 4.23% | 96.7% |
| Example 17 | 400° C./650° C. | 89.0% | 1.73% | 97.0% |
| Example 17 | 400° C./700° C. | 89.7% | 0.92% | 96.9% |
| Example 18 | 400° C./600° C. | 87.4% | 8.42% | 95.1% |
| Example 18 | 400° C./625° C. | 88.3% | 4.35% | 96.2% |
| Example 18 | 400° C./650° C. | 89.0% | 2.32% | 96.1% |
| Example 18 | 400° C./700° C. | 90.0% | 1.10% | 95.9% |
| Example 19 | 400° C./600° C. | 84.7% | 10.9% | 95.5% |
| Example 19 | 400° C./625° C. | 88.2% | 2.91% | 96.4% |
| Example 19 | 400° C./650° C. | 88.6% | 1.37% | 96.8% |
| Example 19 | 400° C./700° C. | 89.6% | 3.34% | 95.9% |
| Example 20 | 400° C./600° C. | 87.3% | 9.03% | 95.6% |
| Example 20 | 400° C./625° C. | 87.4% | 5.20% | 96.0% |
| Example 20 | 400° C./650° C. | 88.1% | 4.09% | 95.4% |
| Example 20 | 400° C./700° C. | 89.6% | 1.58% | 96.1% |
| Example 21 | 400° C./600° C. | 87.3% | 9.07% | 96.0% |
| Example 21 | 400° C./625° C. | 88.2% | 3.99% | 97.7% |
| Example 21 | 400° C./650° C. | 88.8% | 1.95% | 98.0% |
| Example 21 | 400° C./700° C. | 89.2% | 1.74% | 96.9% |
| Example 22 | 400° C./600° C. | 87.5% | 5.76% | 96.2% |
| Example 22 | 400° C./625° C. | 88.5% | 3.08% | 97.5% |
| Example 22 | 400° C./650° C. | 89.3% | 1.54% | 98.0% |
| Example 22 | 400° C./700° C. | 89.9% | 0.95% | 97.3% |
| Example 23 | 400° C./600° C. | 87.6% | 6.06% | 96.6% |
| Example 23 | 400° C./625° C. | 88.5% | 3.15% | 97.8% |
| Example 23 | 400° C./650° C. | 88.6% | 2.18% | 98.1% |
| Example 23 | 400° C./700° C. | 89.4% | 1.63% | 97.7% |

In these examples, taking values of % Haze <1%, several combinations of chemistry and processing are seen as desirable. Example 8 heated at 625° C. and 650° C., Example 14 heated at 600° C., Example 17 heated at 700° C. and Example 22 heated at 700° C. are all trials that give low haze values. The grain boundary healing additives used on in these examples are as follows: Na$_2$SiF$_6$ and H$_2$SiF$_6$ were used in Example 8, H$_2$MoO$_4$ was used in Example 14, $Na_2SiF_6$ was used in Example 17 and in Example 22, $NaNO_3$ and $KNO_3$ were used. It appears that the in the case of this lead-bearing glass, replacing alkali ions on the frit surface and/or the use of fluxing additives is useful for decreasing haze.

Lead-Free Frit Examples

Example 24

0.25 g of phosphoric acid ($H_3PO_4$, 85% in water, available from Thermo Fisher Scientific) and approximately 7.5 g DI water were mixed together in a beaker. The solution was poured over 50 g of S403 frit, weighed onto a plate. S403 frit is a ground glass frit chosen from the ranges of Table 2. The beaker was rinsed and the rinses were added to the plate. The components were stirred together to form a slurry. The plate was placed in a friction forced air drier at 86° C. and heated until the slurry dried. The powder was loosened from the plate with a spatula during the drying process to ensure complete dryness. After drying, the frit was sieved through a 400-Mesh screen before use. 15 g of the modified frit was dispersed into 3.25 g of C92 Medium. The paste was printed through a 420-Mesh nylon screen onto 3"×3" ⅛" glass. The glass was fired at 400° C. for five minutes and then at 600° C. for 5 minutes. After cooling, the optical data were collected on a Haze-Guard Plus, Illuminant C and the results were recorded in Table 10.

Example 25

0.5 g of phosphoric acid ($H_3PO_4$, 85% in water, available from Thermo Fisher Scientific) and approximately 7.5 g DI water were mixed together in a beaker. The solution was poured over 50 g of S403 frit, weighed onto a plate. The beaker was rinsed and the rinses were added to the plate. The components were stirred together to form a slurry. The plate was placed in a friction forced air drier at 86° C. and heated until the slurry dried. The powder was loosened from the plate with a spatula during the drying process to ensure complete dryness. After drying, the frit was sieved through a 400-Mesh screen before use. 15 g of the modified frit was dispersed into 3.25 g of C92 Medium. The paste was printed through a 420-Mesh nylon screen onto 3"×3" ⅛" glass. The glass was fired at 400° C. for five minutes and then at 600° C. for 5 minutes. After cooling, the optical data were collected on a Haze-Guard Plus, Illuminant C and the results were recorded in Table 10.

Comparative Example 26

2.22 g of sodium hydroxide solution (NaOH, 50% wt/wt in water, available from Sigma-Aldrich) and approximately 38 g DI water were mixed together in a beaker at room temperature to give a transparent solution. The solution was poured over 100 g of S403 frit, weighed onto a plate. The beaker was rinsed and the rinses were added to the plate. The components were stirred together to form a slurry. The plate was placed in a friction forced air drier at 80° C. and heated until the slurry dried. The powder was loosened from the plate with a spatula during the drying process to ensure complete dryness. After drying, the frit was sieved through a 325-Mesh screen before use. 15 g of the modified frit was dispersed into 3.25 g of C92 Medium. The paste was printed through a 420-Mesh nylon screen onto 3"×3" ⅛" glass. The glass was fired at 400° C. for five minutes and then at 600° C. for 5 minutes. After cooling, the optical data were collected on a Haze-Guard Plus, Illuminant C and the results were recorded in Table 10.

Theoretically, this sample should show higher haze, since a larger amount of NaOH is present on the surface of the frit grains. As discussed above, it can react with carbon dioxide in the air to produce $Na_2CO_3$. Bubbling should occur at higher temperatures as the $CO_2$ decomposes from the carbonate and the frit begins to fuse.

Comparative Example 27

0.99 g of lithium carbonate ($Li_2CO_3$, a commercially available raw material at Ferro Corporation) and approximately 39 g DI water were mixed together in a beaker with some heating. The salt did not completely dissolve. The mixture was poured over 100 g of S403 frit, weighed onto a plate. The beaker was rinsed and the rinses were added to the plate. The components were stirred together to form a slurry. The plate was placed in a friction forced air drier at 80° C. and heated until the slurry dried. The powder was loosened from the plate with a spatula during the drying process to ensure complete dryness. After drying, the frit was sieved through a 325-Mesh screen before use. 15 g of the modified frit was dispersed into 3.25 g of C92 Medium. The paste was printed through a 420-Mesh nylon screen onto 3"×3" ⅛" glass. The glass was fired at 400° C. for five minutes and then at 600° C. for 5 minutes. After cooling, the optical data were collected on a Haze-Guard Plus, Illuminant C and the results were recorded in Table 10.

Comparative Example 28

1.01 g of sodium carbonate ($Na_2CO_3$, a commercially available raw material at Ferro Corporation) and approximately 39 g DI water were mixed together in a beaker at room temperature to give a transparent solution. The solution was poured over 100 g of S403 frit, weighed onto a plate. The beaker was rinsed and the rinses were added to the plate. The components were stirred together to form a slurry. The plate was placed in a friction forced air drier at 80° C. and heated until the slurry dried. The powder was loosened from the plate with a spatula during the drying process to ensure complete dryness. After drying, the frit was sieved through a 325-Mesh screen before use. 15 g of the modified frit was dispersed into 3.25 g of C92 Medium. The paste was printed through a 420-Mesh nylon screen onto 3"×3" ⅛" glass. The glass was fired at 400° C. for five minutes and then at 600° C. for 5 minutes. After cooling, the optical data were collected on a Haze-Guard Plus, Illuminant C and the results were recorded in Table 10.

Comparative Example 29

1.11 g of potassium carbonate ($K_2CO_3$, a commercially available raw material at Ferro Corporation) and approximately 39 g DI water were mixed together in a beaker at room temperature to give a transparent solution. The solution was poured over 100 g of S403 frit, weighed onto a plate. The beaker was rinsed and the rinses were added to the plate. The components were stirred together to form a slurry. The plate was placed in a friction forced air drier at 80° C. and heated until the slurry dried. The powder was loosened from the plate with a spatula during the drying process to ensure complete dryness. After drying, the frit was sieved through a 325-Mesh screen before use. 15 g of the modified frit was dispersed into 3.25 g of C92 Medium. The paste was printed through a 420-Mesh nylon screen onto 3"×3" ⅛" glass. The glass was fired at 400° C. for five minutes and then at 600° C. for 5 minutes. After cooling, the optical data were collected on a Haze-Guard Plus, Illuminant C and the results were recorded in Table 10.

Example 30

1.0 g of sodium hexafluorosilicate ($Na_2SiF_6$, EM 345, a commercially available raw material at Ferro Corporation) and approximately 39 g DI water were mixed together in a beaker at room temperature to give a transparent solution. The solution was poured over 100 g of S403 frit, weighed onto a plate. The beaker was rinsed and the rinses were added to the plate. The components were stirred together to form a slurry. The plate was placed in a friction forced air drier at 80° C. and heated until the slurry dried. The powder was loosened from the plate with a spatula during the drying process to ensure complete dryness. After drying, the frit was sieved through a 325-Mesh screen before use. 15 g of the modified frit was dispersed into 3.25 g of C92 Medium. The paste was printed through a 420-Mesh nylon screen onto 3"×3" ⅛" glass. The glass was fired at 400° C. for five minutes and then at 600° C. for 5 minutes. After cooling, the optical data were collected on a Haze-Guard Plus, Illuminant C and the results were recorded in Table 10.

Example 31

3.03 g of hexafluorosilicic acid ($H_2SiF_6$, 35% wt/wt, available from Alfa-Aesar) and approximately 37 g DI water were mixed together in a beaker at room temperature to give a transparent solution. The solution was poured over 100 g of S403 frit, weighed onto a plate. The beaker was rinsed and the rinses were added to the plate. The components were stirred together to form a slurry. The plate was placed in a friction forced air drier at 80° C. and heated until the slurry dried. The powder was loosened from the plate with a spatula during the drying process to ensure complete dryness. After drying, the frit was sieved through a 325-Mesh screen before use. 15 g of the modified frit was dispersed into 3.25 g of C92 Medium. The paste was printed through a 420-Mesh nylon screen onto 3"×3" ⅛" glass. The glass was fired at 400° C. for five minutes and then at 600° C. for 5 minutes. After cooling, the optical data were collected on a Haze-Guard Plus, Illuminant C and the results were recorded in Table 10.

Example 32

1.1 g of phosphoric acid ($H_3PO_4$, 85%, available from Thermo-Fisher Scientific) and approximately 40 g DI water were mixed together in a beaker at room temperature to give a transparent solution. The solution was poured over 100 g of S403 frit, weighed onto a plate. The beaker was rinsed and the rinses were added to the plate. The components were stirred together to form a slurry. The plate was placed in a friction forced air drier at 80° C. and heated until the slurry dried. The powder was loosened from the plate with a spatula during the drying process to ensure complete dryness. After drying, the frit was sieved through a 325-Mesh screen before use. 15 g of the modified frit was dispersed into 3.25 g of C92 Medium. The paste was printed through a 420-Mesh nylon screen onto 3"×3" ⅛" glass. The glass was fired at 400° C. for five minutes and then at 600° C. for 5 minutes. After cooling, the optical data were collected on a Haze-Guard Plus, Illuminant C and the results were recorded in Table 10.

Example 33

6.00 g of hexafluorosilicic acid ($H_2SiF_6$, 35% wt/wt, available from Alfa-Aesar) and approximately 34 g DI water were mixed together in a beaker at room temperature to give a transparent solution. The solution was poured over 100 g of S403 frit, weighed onto a plate. The beaker was rinsed and the rinses were added to the plate. The components were stirred together to form a slurry. The plate was placed in a friction forced air drier at 80° C. and heated until the slurry dried. The powder was loosened from the plate with a spatula during the drying process to ensure complete dryness. After drying, the frit was sieved through a 325-Mesh screen before use. 15 g of the modified frit was dispersed into 3.25 g of C92 Medium. The paste was printed through a 420-Mesh nylon screen onto 3"×3" ⅛" glass. The glass was fired at 400° C. for five minutes and then at 600° C. for 5 minutes. After cooling, the optical data were collected on a Haze-Guard Plus, Illuminant C and the results were recorded in Table 10.

Example 34

15.00 g of hexafluorosilicic acid ($H_2SiF_6$, 35% wt/wt, available from Alfa-Aesar) and approximately 25 g DI water were mixed together in a beaker at room temperature to give a transparent solution. The solution was poured over 100 g of S403 frit, weighed onto a plate. The beaker was rinsed and the rinses were added to the plate. The components were stirred together to form a slurry. The plate was placed in a friction forced air drier at 80° C. and heated until the slurry dried. The powder was loosened from the plate with a spatula during the drying process to ensure complete dryness. After drying, the frit was sieved through a 325-Mesh screen before use. 15 g of the modified frit was dispersed into 3.25 g of C92 Medium. The paste was printed through a 420-Mesh nylon screen onto 3"×3" ⅛" glass. The glass was fired at 400° C. for five minutes and then at 600° C. for 5 minutes. After cooling, the optical data were collected on a Haze-Guard Plus, Illuminant C and the results were recorded in Table 10.

Table 10 contains the firing temperatures and optical data for Examples 23-34.

TABLE 10

Firing Temperatures and Optical Data for Examples 23-34

| Sample # | Firing Temperature | % Trans. | % Haze | % Clarity |
|---|---|---|---|---|
| Blank | NA | 91.9% | 0.07% | 100% |
| Example 24 | 400° C./600° C. | 84.2% | 1.64% | 99.6% |
| Example 25 | 400° C./600° C. | 84.5% | 1.57% | 99.1% |
| Example 26 | 400° C./600° C. | 62.7% | 72.0% | 90.8% |
| Example 27 | 400° C./600° C. | 84.5% | 3.00% | 95.3% |
| Example 28 | 400° C./600° C. | 84.8% | 1.83% | 99.4% |
| Example 29 | 400° C./600° C. | 85.0% | 1.73% | 99.4% |
| Example 30 | 400° C./600° C. | 84.8% | 2.55% | 99.3% |
| Example 31 | 400° C./600° C. | 83.9% | 6.04% | 99.4% |
| Example 32 | 400° C./600° C. | 84.6% | 2.10% | 98.7% |
| Example 33 | 400° C./600° C. | 83.8% | 2.80% | 99.3% |
| Example 34 | 400° C./600° C. | 80.2% | 65.5% | 79.9% |

From Table 10, Examples 24, 25, 28 and 29 show promise for working as grain-boundary-healing treatments, since the % Haze values are low and the % Transmission and % Clarity values are high.

Further embodiments of the invention are represented hereinbelow.

Item 1. A method of preparing a treated glass frit comprising:
  smelting raw material to produce a glass batch;
  quenching the glass batch to produce an amorphous solid;
  milling the amorphous solid to produce glass frit; and
  mixing a grain-boundary-healing additive with the glass frit to thereby prepare the treated glass frit.

Item 2. The method of Item 1, wherein the grain-boundary-healing additive comprises an organometallic compound containing at least one of Li, Na, K, Ba, V, Mn, Mo, W, Zn, In, Ga, Al, B, Si, P, Fe, Ta, Sb, Bi, Sn, Ge, Te, Y and As.

Item 3. The method of Item 2, wherein the organometallic compound comprises a phosphonate compound.

Item 4. The method of Item 1, wherein the grain-boundary-healing additive comprises an inorganic acid or a corresponding salt of an inorganic acid.

Item 5. The method of Item 1, wherein mixing the grain-boundary-healing additive with the glass frit is performed during milling.

Item 6. The method of Item 5, wherein milling is performed in the presence of a liquid which combines with the glass frit to form a slurry, and wherein the grain-boundary-healing additive is added to the slurry.

Item 7. The method of Item 6, further comprising removing liquid from the slurry wherein the grain-boundary-healing additive is deposited onto surfaces of the glass frit.

Item 8. The method of Item 1, wherein the raw material includes a coloring agent.

Item 9. The method of Item 1, further comprising adding a coloring agent to the glass batch.

Item 10. The method of Item 1, wherein the glass frit includes at least one of transparent glass frit, colored transparent glass frit, or opaque glass frit.

Item 11. A method of preparing a glass enamel paste comprising:
  providing glass frit;
  mixing the glass frit with a grain-boundary-healing additive to produce a treated glass frit; and
  combining the treated glass frit with an organic carrier to thereby prepare an enamel paste.

Item 12. The method of Item 11, wherein the grain-boundary-healing additive comprises an organometallic compound containing at least one of Li, Na, K, Ba, V, Mn, Mo, W, Zn, In, Ga, Al, B, Si, P, Fe, Ta, Sb, Bi, Sn, Ge, Te, Y and As.

Item 13. The method of Item 12, wherein the organometallic compound comprises a phosphonate compound.

Item 14. The method of Item 11, wherein the grain-boundary-healing additive comprises an inorganic acid or a corresponding salt of an inorganic acid.

Item 15. The method of Item 11, wherein the glass frit includes a coloring agent.

Item 16. The method of Item 11, further comprising adding a coloring agent to the enamel paste.

Item 17. The method of Item 11, wherein providing the glass frit includes smelting a mixture of raw material to produce a molten glass batch, quenching the molten glass batch to produce an amorphous solid, and milling the amorphous solid to produce the glass frit.

Item 18. The method of Item 17, wherein mixing the glass frit with the grain-boundary-healing additive is performed during milling.

Item 19. The method of Item 18, wherein mixing the glass frit with the grain-boundary-healing additive includes adding a fluid to the glass frit during milling to form a slurry, and removing the fluid from the slurry such that the grain-boundary-healing additive dries on the surfaces of the glass frit to thereby produce the treated glass frit.

Item 20. The method of Item 17, wherein the mixture of raw material includes a coloring agent.

Item 21. The method of Item 17, further comprising adding a coloring agent to the molten glass batch.

Item 22. A method of preparing glass enamel on a substrate, the method comprising:
  providing enamel paste including treated glass frit and an organic carrier, the treated glass frit including a grain-boundary-healing additive on surfaces thereof;
  applying the enamel paste to a substrate;
  firing the enamel paste to fuse the glass frit and burn out the organic carrier to thereby prepare glass enamel on the substrate.

Item 23. The method of Item 22, wherein providing an enamel paste includes:
  smelting raw material to produce a glass batch,
  quenching the glass batch to produce an amorphous solid,
  milling the amorphous solid to produce glass frit;
  contacting the grain-boundary-healing additive to the glass frit to provide the enamel paste.

Item 24. The method of Item 22, wherein contacting includes dissolving the grain-boundary-healing additive in the organic carrier to form a solution and adding the frit to the solution to form the enamel paste.

Item 25. The method of Item 23, wherein a coloring additive is dissolved in the solution.

Item 26. The method of Item 22, wherein the grain-boundary-healing additive comprises an organometallic compound containing at least one of Li, Na, K, Ba, V, Mn, Mo, W, Zn, In, Ga, Al, B, Si, P, Fe, Ta, Sb, Bi, Sn, Ge, Te, Y and As.

Item 27. The method of Item 24, wherein the organometallic compound comprises a phosphonate compound.

Item 28. The method of Item 22, wherein the grain-boundary-healing additive comprises an inorganic acid or a corresponding salt of an inorganic acid.

Item 29. The method of Item 23, wherein contacting the grain-boundary-healing additive to the glass frit is performed during milling.

Item 30. The method of Item 23, wherein milling is performed in the presence of a liquid which combines with the glass frit to form a slurry, and wherein the grain-boundary-healing additive is added to the slurry.

Item 31. The method of Item 28, further comprising removing liquid from the slurry wherein the grain-boundary-healing additive is deposited onto surfaces of the glass frit.

Item 32. The method of Item 23, wherein the raw material includes a coloring agent.

Item 33. The method of Item 23, further comprising adding a coloring agent to the glass batch.

Item 34. The method of Item 22, wherein the treated glass frit includes at least one of transparent glass frit, colored transparent glass frit, or opaque glass frit.

Item 35. A medium for treating glass frit, the medium comprising a grain-boundary-healing additive dissolved in an organic carrier, the grain-boundary-healing additive comprising one of:
  i) an organometallic compound containing at least one of Li, Na, K, Ba, V, Mn, Mo, W, Zn, In, Ga, Al, B, Si, P, Fe, Ta, Sb, Bi, Sn, Ge, Te, Y and As, or
  ii) an inorganic acid or a corresponding salt of an inorganic acid.

Item 36. The medium of Item 35, wherein the grain-boundary-healing additive includes an organometallic compound comprising a phosphonate compound.

Item 37. The medium of Item 35, further comprising a coloring agent dissolved in the organic carrier.

Item 38. The medium of Item 35, wherein the organic carrier comprises an organic binder and a solvent.

Item 1a. A method of preparing a treated glass frit comprising:
 smelting raw material to produce a glass batch;
 quenching the glass batch to produce an amorphous solid;
 milling the amorphous solid to produce glass frit; and
 mixing a grain-boundary-healing additive with the glass frit to thereby prepare the treated glass frit, wherein the grain-boundary-healing additive comprises an organometallic compound containing at least one selected from the group consisting of Li, Na, K, Ba, V, Mn, Mo, W, Zn, In, Ga, Al, B, Si, P, Fe, Ta, Sb, Bi, Sn, Ge, Te, Y and As.

Item 2a. The method of Item 1a, wherein the grain-boundary-healing additive is selected from the group consisting of molybdenum (V) ethoxide, molybdenyl triethoxide, molybdenyl acetylacetonate, tungsten(V) ethoxide, tungsten(VI) ethoxide, tungsten(VI) isopropoxide, trimethylene borate, triethyl borate, triisopropyl borate, trimethyl borate, niobium(V) ethoxide, niobium(V) isopropoxide, niobium(V) n-propoxide, niobium(V) n-butoxide, niobium(V) n-pentyloxide, tantalum(V) methoxide, tantalum(V) ethoxide, tantalum(V) isopropoxide, antimony(III) methoxide, antimony(III) ethoxide, antimony(III) isopropoxide, bismuth(III) tert-pentyloxide, tin(II) oxalate, tin(IV) methoxide, tin(IV) ethoxide, tin(IV) isopropoxide, tin(IV) tert-butoxide, germanium(IV) methoxide, germanium(IV) ethoxide, germanium(IV) isopropoxide, germanium(IV) n-butoxide, tellurium(IV) ethoxide, barium ethoxide, barium isopropoxide, indium(III) ethoxide, indium(III) isopropoxide, gallium(III) ethoxide, gallium(III) isopropoxide, aluminum(III) ethoxide, aluminum(III) isopropoxide, aluminum(III) n-butoxide, aluminum(III) sec-butoxide, aluminum(III) tert-butoxide, yttrium(III) isopropoxide, zinc(II) methoxyethoxide, silicon(IV) ethoxide and silicon(IV) isopropoxide.

Item 3a. The method of Item 2a, wherein the organometallic compound comprises at least one phosphorus compound selected from the group consisting of phosphites, phosphonites, phosphates and phosphonates.

Item 4a. The method of Item 3a, wherein the at least one phosphorus compound is a phosphonate selected from the group consisting of 2-phosphonopropionic acid, 3-phosphonopropionic acid, diethyl 2,2-diethoxyethyl phosphonate, diethyl hydroxymethylphosphonate, diisopropyl methylphosphonate, diethyl 2,2-dimethoxyethylphosphonate, ethylphosphonic acid, methylphosphonic acid, methylenediphosphonic acid and 1,2 ethylenediphosphonic acid.

Item 5a. The method of Item 1a, wherein the grain-boundary-healing additive comprises an inorganic acid or a salt of an inorganic acid.

Item 6a. The method of Item 5a, wherein the grain-boundary-healing additive is selected from the group consisting of boric acid, phosphoric acid, telluric acid, hexafluoro-silicic acid, hexafluoro-phosphoric acid, tetrafluoroboric acid, hexafluoroantimonic acid, dihydrogen hexafluorozirconate, molybdic acid, nitric acid, tungstic acid, borax, mono-ammonium phosphate, mono-sodium phosphate, tri-sodium phosphate, sodium nitrate, potassium nitrate, sodium hexa-fluorosilicate, potassium hexa-fluorosilicate, sodium hexafluorosilicate and sodium hexa-fluorophosphate.

Item 7a. The method of Item 1a, wherein mixing the grain-boundary-healing additive with the glass frit is performed during milling.

Item 8a. The method of Item 5a, wherein milling is performed in the presence of a liquid which combines with the glass frit to form a slurry, and wherein the grain-boundary-healing additive is added to the slurry.

Item 9a. The method of Item 6a, further comprising removing liquid from the slurry wherein the grain-boundary-healing additive is deposited onto surfaces of the glass frit.

Item 10a. The method of Item 1a, wherein the raw material includes a coloring agent.

Item 11a. The method of Item 1a, further comprising adding a coloring agent to the glass batch.

Item 12a. The method of Item 10a or 11a wherein the coloring agent is selected from the group consisting of $V_2O_5$, $Cr_2O_3$, $MnO_2$, $Fe_2O_3$, CoO, NiO, CuO, $Ga_2O_3$, $GeO_2$, $Nb_2O_5$, $MoO_3$, $Ag_2O$, $In_2O_3$, $La_2O_3$, $WO_3$, $SnO_2$, $Sb_2O_3$, $SO_3$, $SeO_2$, $TeO_2$ and combinations thereof.

Item 13a. The method of Item 1a, wherein the glass frit includes at least one of transparent glass frit, colored transparent glass frit, or opaque glass frit.

Item 14a. The method of Item 1a, wherein the glass frit comprises Bi, Zn and B, and the grain-boundary-healing additives include phosphorus.

Applications for the products and methods disclosed herein include enamels, such as transparent colorless, transparent colored and opaque enamels.

Further applications are found in commonly owned U.S. Pat. Nos. 9,205,505 and 9,156,735, and U.S. Pat. App. Pub. Nos. 2015/0177426, 2014/0314969, 2014/0299254, 2014/0026619, 2013/0236662, 2013/0206230, 2013/0164466, 2013/0111953 and 2013/0104980, which are hereby incorporated by reference in their entireties.

Examples of applications of the compositions of the invention include automotive glass, architectural glass, low-e glass coatings, solar cells, solar cell contacts, organic PV devices, plasma display devices, nanocrystal displays, electrochromic devices, electrochromic material systems, suspended particle devices, micro-blinds, liquid crystal devices, smart windows, switchable windows, smart glass, eglass, vacuum insulated glass (VIG), MEMS devices, smart phones, cellular phones, televisions, LED (including cover glass therefor), SED, FED, OLED, LCD, DLP, FLD, IMOD, TDEL, QDLED, TMOS, TPD, LCL, LPD, or OLET.

Further investigation will no doubt uncover other compounds that are capable of improving the optical behavior of frits upon firing. Undoubtedly, other frits that display good optical properties when surface-treated with grain-boundary-healing additives will also be found. These alternative compounds and frits will not deviate from the spirit of the present subject matter.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. A method of preparing a treated glass frit comprising:
smelting glass-forming raw material to produce a glass batch;
quenching the glass batch to produce an amorphous solid;
milling the amorphous solid to produce glass frit; and
mixing a grain-boundary-healing additive with the glass frit to thereby prepare the treated glass frit, wherein the grain-boundary-healing additive comprises an organometallic compound containing at least one selected from the group consisting of Li, Na, K, Ba, V, Mn, Mo, W, In, Ga, Si, P, Fe, Ta, Sb, Bi, Sn, Ge, Te, Y and As, wherein the grain-boundary-healing additive is selected from the group consisting of molybdenum (V) ethoxide, molybdenyl triethoxide, molybdenyl acetylacetonate, tungsten(V) ethoxide, tungsten(VI) ethoxide, tungsten(VI) isopropoxide, niobium(V) ethoxide, niobium(V) isopropoxide, niobium(V) n-propoxide, niobium(V) n-butoxide, niobium(V) n-pentyloxide, tantalum(V) methoxide, tantalum(V) ethoxide, tantalum(V) isopropoxide, antimony(III) methoxide, antimony(III) ethoxide, antimony(III) isopropoxide, bismuth(III) tert-pentyloxide, tin(II) oxalate, tin(IV) methoxide, tin(IV) ethoxide, tin(IV) isopropoxide, tin(IV) tert-butoxide, germanium(IV) methoxide, germanium(IV) ethoxide, germanium(IV) isopropoxide, germanium(IV) n-butoxide, tellurium(IV) ethoxide, barium ethoxide, barium isopropoxide, indium(III) ethoxide, indium(III) isopropoxide, gallium(III) ethoxide, gallium(III) isopropoxide, yttrium(III) isopropoxide, silicon(IV) ethoxide and silicon(IV) isopropoxide.

2. The method of claim 1, wherein the organometallic compound comprises at least one phosphorus compound selected from the group consisting of phosphites, phosphonites, phosphates and phosphonates.

3. The method of claim 2, wherein the at least one phosphorus compound is a phosphonate selected from the group consisting of 2-phosphonopropionic acid, 3-phosphonopropionic acid, diethyl 2,2-diethoxyethyl phosphonate, diethyl hydroxymethylphosphonate, diisopropyl methylphosphonate, diethyl 2,2-dimethoxyethylphosphonate, ethylphosphonic acid, methylphosphonic acid, methylenediphosphonic acid and 1,2 ethylenediphosphonic acid.

4. The method of claim 1, wherein the grain-boundary-healing additive comprises an inorganic acid or a salt of an inorganic acid.

5. The method of claim 4, wherein the grain-boundary-healing additive is selected from the group consisting of phosphoric acid, telluric acid, hexafluoro-silicic acid, hexafluoro-phosphoric acid, hexafluoroantimonic acid, dihydrogen hexafluorozirconate, molybdic acid, nitric acid, tungstic acid, mono-ammonium phosphate, mono-sodium phosphate, tri-sodium phosphate, sodium nitrate, potassium nitrate, sodium hexa-fluorosilicate, potassium hexa-fluorosilicate, sodium hexafluorosilicate and sodium hexa-fluorophosphate.

6. The method of claim 1, further comprising adding a coloring agent to the glass batch.

7. The method of claim 6 wherein the coloring agent is selected from the group consisting of $V_2O_5$, $Cr_2O_3$, $MnO_2$, $Fe_2O_3$, CoO, NiO, CuO, $Ga_2O_3$, $GeO_2$, $Nb_2O_5$, $MoO_3$, $Ag_2O$, $In_2O_3$, $La_2O_3$, $WO_3$, $SnO_2$, $Sb_2O_3$, $SO_3$, $SeO_2$, $TeO_2$ and combinations thereof.

8. The method of claim 1, wherein the glass frit includes at least one of transparent glass frit, colored transparent glass frit, or opaque glass frit.

9. The method of claim 1, wherein the glass frit comprises Bi, Zn and B, and the grain-boundary-healing additives include phosphorus.

10. A method of preparing a glass enamel paste comprising:
providing a glass frit, the glass frit produced according to the method of claim 1;
mixing the glass frit with a grain-boundary-healing additive to produce a treated glass frit; and
combining the treated glass frit with an organic carrier to thereby prepare an enamel paste, wherein
the grain-boundary-healing additive comprises an organometallic compound containing at least one of Li, Na, K, Ba, V, Mn, Mo, W, In, Ga, Si, P, Fe, Ta, Sb, Bi, Sn, Ge, Te, Y and As wherein the grain-boundary-healing additive is selected from the group consisting of molybdenum (V) ethoxide, molybdenyl triethoxide, molybdenyl acetylacetonate, tungsten(V) ethoxide, tungsten (VI) ethoxide, tungsten (VI) isopropoxide, niobium(V) ethoxide, niobium(V) isopropoxide, niobium(V) n-propoxide, niobium(V) n-butoxide, niobium(V) n-pentyloxide, tantalum(V) methoxide, tantalum(V) ethoxide, tantalum(V) isopropoxide, antimony(III) methoxide, antimony(III) ethoxide, antimony(III) isopropoxide, bismuth(III)tert-pentyloxide, tin(II) oxalate, tin(IV) methoxide, tin(IV) ethoxide, tin/IV) isopropoxide, tin(IV) tert-butoxide, germanium(IV) methoxide, germanium(IV) ethoxide, germanium(IV) isopropoxide, germanium(IV) n-butoxide, tellurium(IV) ethoxide, barium ethoxide, barium isopropoxide, indium(III) ethoxide, indium(III) isopropoxide, gallium(III) ethoxide, gallium{II) isopropoxide, yttrium(III) isopropoxide, silicon{V) ethoxide and silicon(IV) isopropoxide.

* * * * *